(12) United States Patent
Hansen et al.

(10) Patent No.: US 6,584,482 B1
(45) Date of Patent: *Jun. 24, 2003

(54) MULTIPLIER ARRAY PROCESSING SYSTEM WITH ENHANCED UTILIZATION AT LOWER PRECISION

(75) Inventors: Craig C. Hansen, Los Altos, CA (US); Henry Massalin, Sunnyvale, CA (US)

(73) Assignee: Microunity Systems Engineering, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/377,182

(22) Filed: Aug. 19, 1999

Related U.S. Application Data

(63) Continuation of application No. 08/857,596, filed on May 16, 1997, now Pat. No. 5,953,241, which is a continuation-in-part of application No. 08/516,036, filed on Aug. 16, 1995, now Pat. No. 5,742,840.
(60) Provisional application No. 60/021,132, filed on May 17, 1996.

(51) Int. Cl.[7] .............................................. G06F 17/15
(52) U.S. Cl. ...................... 708/523; 708/420; 708/501; 708/603; 712/221
(58) Field of Search ............................. 708/523, 501, 708/319, 603, 420; 712/221

(56) References Cited

U.S. PATENT DOCUMENTS

| | | | |
|---|---|---|---|
| 4,876,660 A | 10/1989 | Owen et al. | 364/764 |
| 4,956,801 A | 9/1990 | Priem et al. | 364/748 |
| 4,969,118 A | 11/1990 | Montoye et al. | 364/748 |
| 5,032,865 A | 7/1991 | Schlunt | 364/750.5 |
| 5,408,581 A | 4/1995 | Suzuki et al. | 364/724.16 |
| 5,500,811 A | 3/1996 | Corry | 364/724.16 |

*Primary Examiner*—David H. Malzahn
(74) *Attorney, Agent, or Firm*—McDermott, Will & Emery

(57) ABSTRACT

A multiplier array processing system which improves the utilization of the multiplier and adder array for lower-precision arithmetic is described. New instructions are defined which provide for the deployment of additional multiply and add operations as a result of a single instruction, and for the deployment of greater multiply and add operands as the symbol size is decreased.

23 Claims, 13 Drawing Sheets

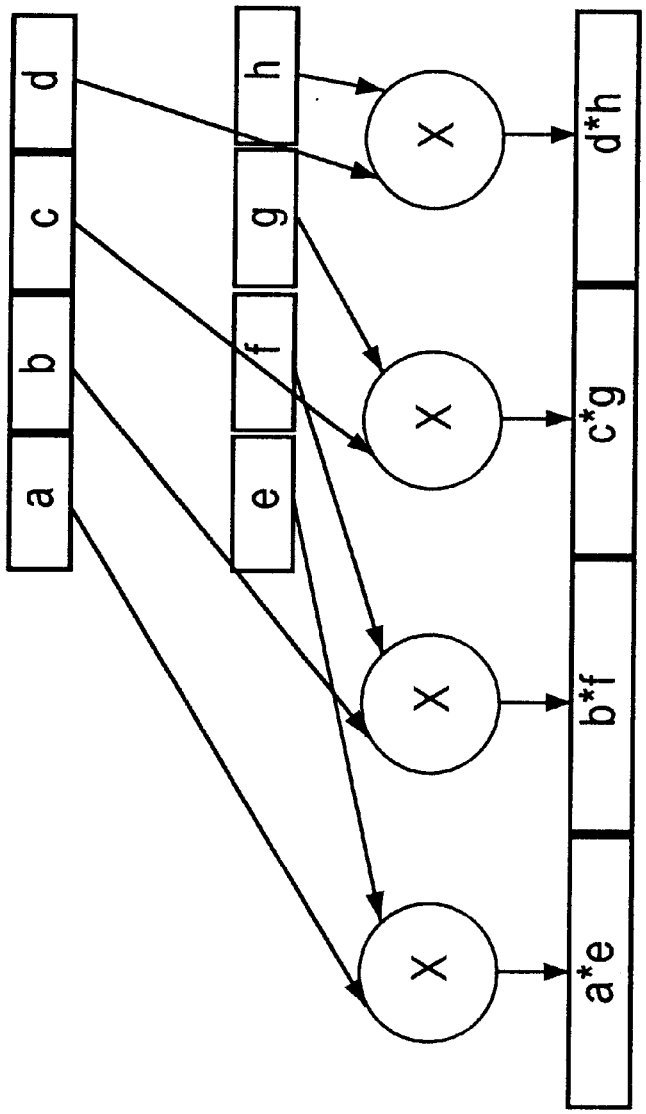
Figure 1  Group Fixed-point Multiply

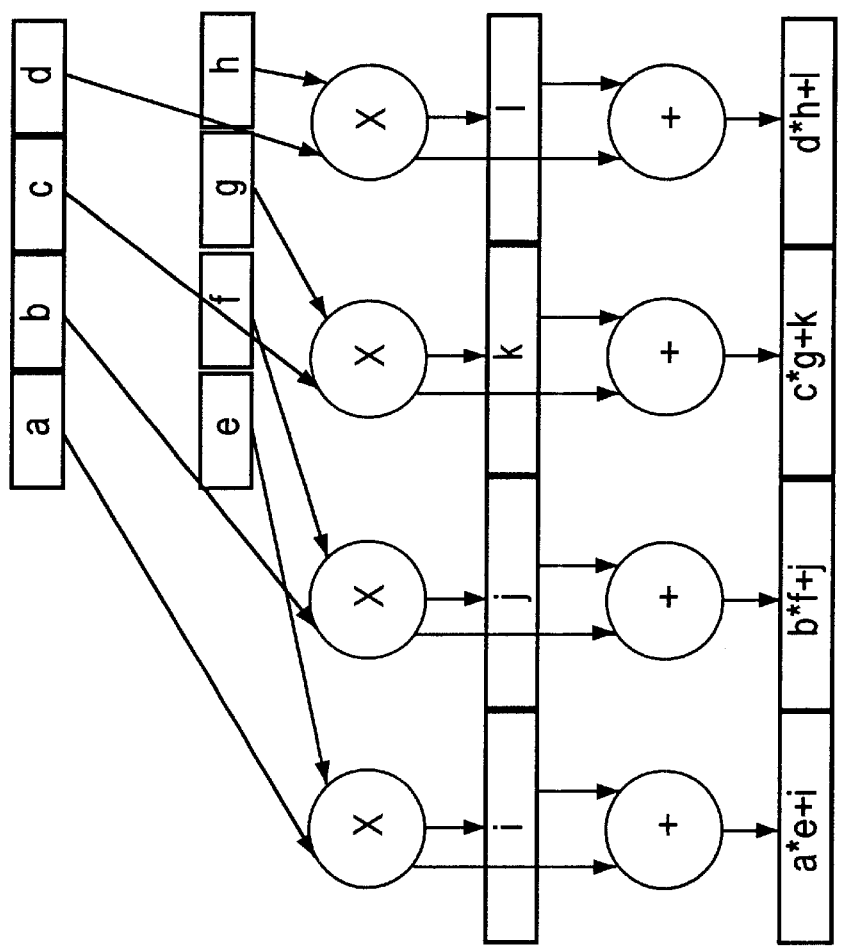
Figure 2  Group Fixed-point Multiply and Add

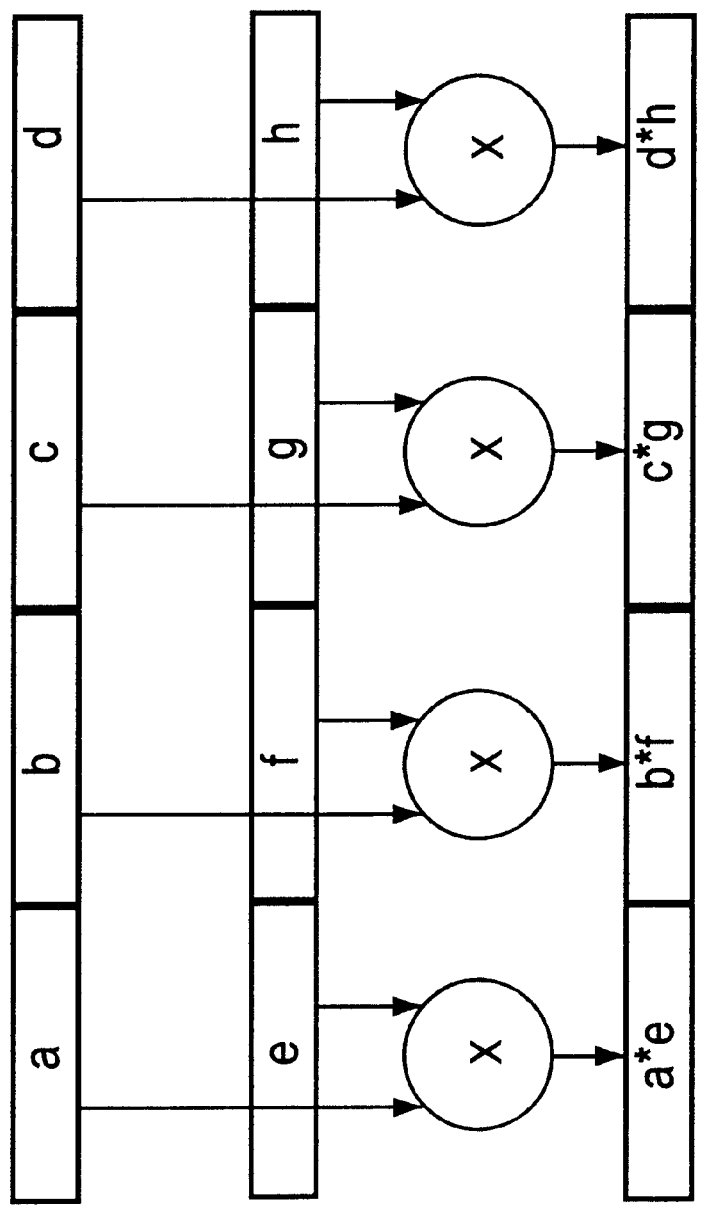

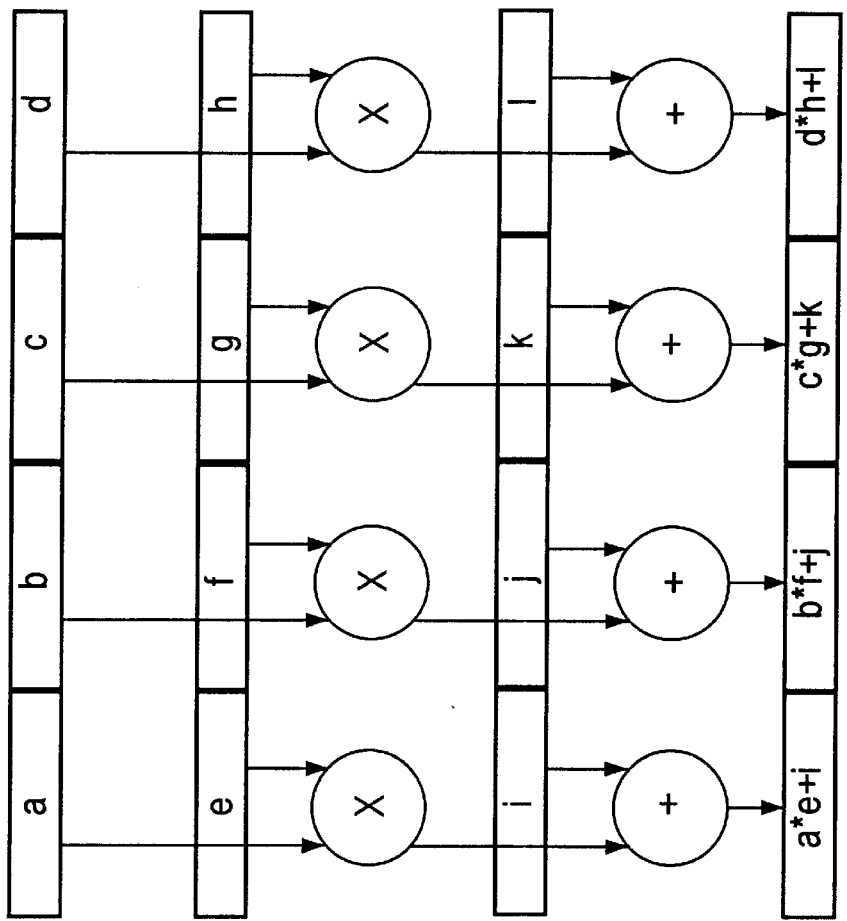
Figure 4   Group Floating-point Multiply and Add

Group Integer Multiply

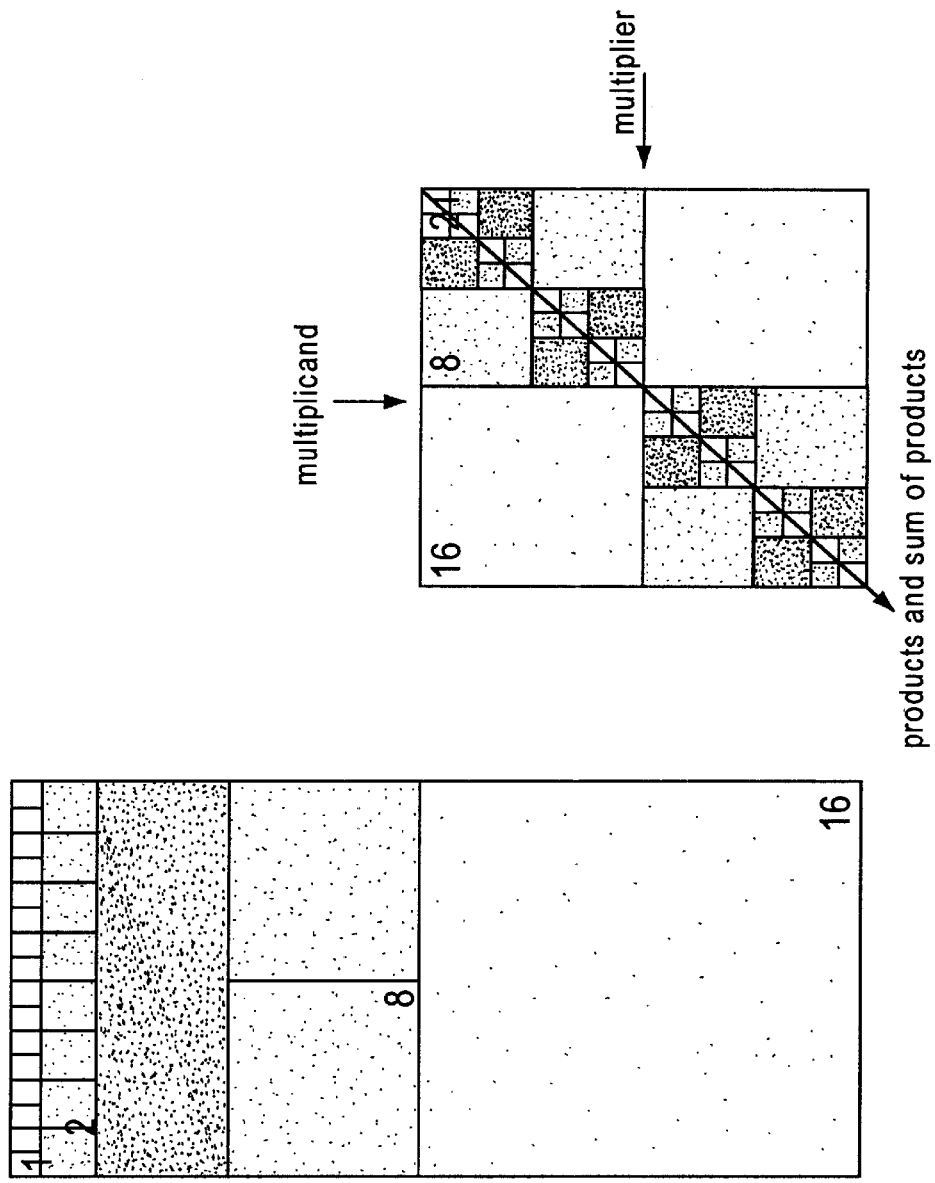
Figure 12  Group Multiply-and-sum

US 6,584,482 B1

MULTIPLIER ARRAY PROCESSING SYSTEM WITH ENHANCED UTILIZATION AT LOWER PRECISION

RELATED APPLICATIONS

This is a continuation of application Ser. No. 08/857,596, filed May 16, 1997, now U.S. Pat. No. 5,953,241, which claims priority to Provisional Application No. 60/021,132, filed May 17, 1996 entitled MULTIPLIER ARRAY PROCESSING SYSTEM WITH ENHANCED UTILIZATION AT LOWER PRECISION, and also is a continuation in part of application Ser. No. 08/516,036, filed Aug. 16, 1995, now U.S. Pat. No. 5,742,840.

FIELD OF THE INVENTION

The present invention relates to an instruction set and data paths of processors which perform fixed-point and floating-point multiply and add operations, and particularly processors which perform both multiply and add operations as a result of a single instruction.

BACKGROUND OF THE INVENTION

A general-purpose processing system which performs multiply and add operations may allow these arithmetic operations to be performed at varying precision. High-precision operations generally consume greater circuit resources than low-precision operations. For example, in order to double the precision of a multiply operation, about four times as many circuits are required if the same performance is to be achieved.

A multiplier array which is capable of performing a multiply of two 64-bit operands, without reusing the array in sequential fashion, must generate the equivalent of $64^2$, or 4096 bits of binary product (a 1-bit multiply is the same as a boolean or binary "and" operation), and reduce the product bits in an array of binary adders which produces 128 bits of result. As a single binary adder (a full adder) takes in three inputs and produces two outputs, the number of binary adders required for such an array can be computed $64^2-128$, or 3968.

There are well-known techniques for reducing the number of product bits, such as Booth encoding. There are also well-known techniques for performing the required add operations so as to minimize delay, such as the use of arrays of carry-save-adders. These techniques can reduce the size of multiplier arrays and reduce the delay of addition arrays, however, these techniques do not appreciably change the relation between the size of the operand and the size of the multiplier and adder arrays.

Using the same arithmetic as before, a multiply of 32-bit operands generates the equivalent of $32^2$, or 1024 bits of binary product, and use the $32^2-64$, or 960 full adders to generate a 64-bit product. This clearly is approximately one fourth the resources required for a multiply of 64-bit operands.

Because the product of 32-bit operands is 64-bits, while the product of 64-bit operands is 128-bits, one can perform two 32-bit multiples which produce 2 64-bit products, giving a 128-bit result. As such, because the 32-bit product uses one-fourth the resources of the 64-bit product, these two 32-bit products use one-half the resources of the 64-bit product. Continuing this computation, four 16-bit products use one-quarter of the 64-bit multiplier resources, eight 8-bit products use one-eighth of the resources, and so forth.

Thus, while this technique produces results with the same number of bits as the 64-bit product, decreasing the symbol size results in a proportionately decreasing utilization of the multiplier and adder array resources. Clearly, a design that has sufficient resources for a 64-bit multiply will be underutilized for multiplies on smaller symbols.

Accordingly, there exits a need for a method, instruction set and system in which a set of multiplier and adder circuit resources may be employed in a manner that increases the utilization of these resources for performing several multiply and add operations at once as a result of executing an instruction, and which also permits the expansion of the multiplier and adder circuit resources to an even higher level so as to further increase overall performance.

SUMMARY OF THE INVENTION

The present invention relates to a method, instruction, and system which improves the utilization of a multiplier and adder array for performing multiply and add operations at a lower precision than the full word size of the processor and particularly the multiplier and adder array.

In accordance with an exemplary embodiment of the present invention, a novel group-multiply-and-sum instruction is performed wherein operands which are the word size of the processor, for example, 128-bits, are divided into symbols where the symbols are 64, 32, 16, 8, 4, 2, or 1 bit. Multiplier and multiplicand symbols are then multiplied together, and the products are added together so as to produce a single scalar result. The instruction performs twice as many multiplies as a group-multiply-and-add instruction (as described in related U.S. patent application Ser. No. 08/516,036, hereinafter referred to as the parent application) of the same symbol size. The instruction also avoids fixed-point overflows, because in the current example, the 128-bit result is large enough to hold the sum.

In another embodiment of the present invention, a novel group multiply-and-sum-and-add instruction is performed, wherein two operands are divided into symbols and then multiplied together. All the products resulting therefrom are then added together, along with a third operand value so as to produce a single scalar result. The instruction performs twice as many multiplies as a group-multiply-and-add instruction (as described in the parent application) of the same symbol size.

In another embodiment of the present invention, a novel group-complex-multiply instruction is performed, wherein the 64-bit multiplier and multiplicand operands are divided into symbols. Alternate symbols are taken to represent real parts (a and c) and imaginary parts (b and d) of a complex value, and a computation $(a+bi)*(c+di)=(ac-bd)+(bc+ad)i$ is performed. The instruction performs twice as many multiples as a group-multiply instruction (as described in the parent application) of the same symbol size, and in the current embodiment generates a result which is a 128-bit value.

In another embodiment of the present invention, a novel group-complex-multiply-and-add is performed, wherein two 64-bit operands are divided into complex-valued symbols, and a third 128-bit operand is divided into complex-valued symbols of twice the symbol size. The computation $(a+bi)*(c+di)+(e+fi)=(ac-bd+e)+(bc+ad+f)i$ is performed. The result is a 128-bit value.

In yet another embodiment of the present invention, a novel group-convolve instruction is performed, wherein all but one symbol of a 128-bit value is multiplied with symbols of a 64-bit value. Certain of these products are summed together to form a 64-bit-by-64-bit slice of a convolution. The result is a 128-bit value.

As described in detail below, the present invention provides important advantages over the prior art. Most importantly, the present invention optimizes both system performance and overall power efficiency. The present invention performs a greater number of multiply operations and add operations in a single instruction without increasing the size of the result of this single instruction. The present invention arranges these operations in a manner which is advantageous both for implementation of digital signal processing algorithms, as the instructions perform these operations with greater parallelism and greater avoidance of arithmetic overflow, and which is advantageous for implementation of the multiplier itself, as these multipliers are formed from a partitioning of a single multiplier array, thereby overcoming significant disadvantages suffered by prior art devices as detailed above.

Additional advantages of the present invention will become apparent to those skilled in the art from the following detailed description of exemplary embodiments, which exemplify the best mode of carrying out the invention.

The invention itself, together with further objects and advantages, can be better understood by reference to the following detailed description and the accompanying drawings.

BRIEF DESCRIPTION OF THE DRAWINGS

FIG. 1 illustrates a group fixed-point multiply instruction, as described in the parent application.

FIG. 2 illustrates a group fixed-point multiply and add instruction, as described in the parent application.

FIG. 3 illustrates a group floating-point multiply instruction, as described in the parent application.

FIG. 4 illustrates a group floating-point multiply and add instruction, as described in the parent application.

FIG. 12 illustrates how the instructions of FIGS. 5–6 can be produced from partitions of a single multi-precision multiplier array.

DETAILED DESCRIPTION

Figure 5A:
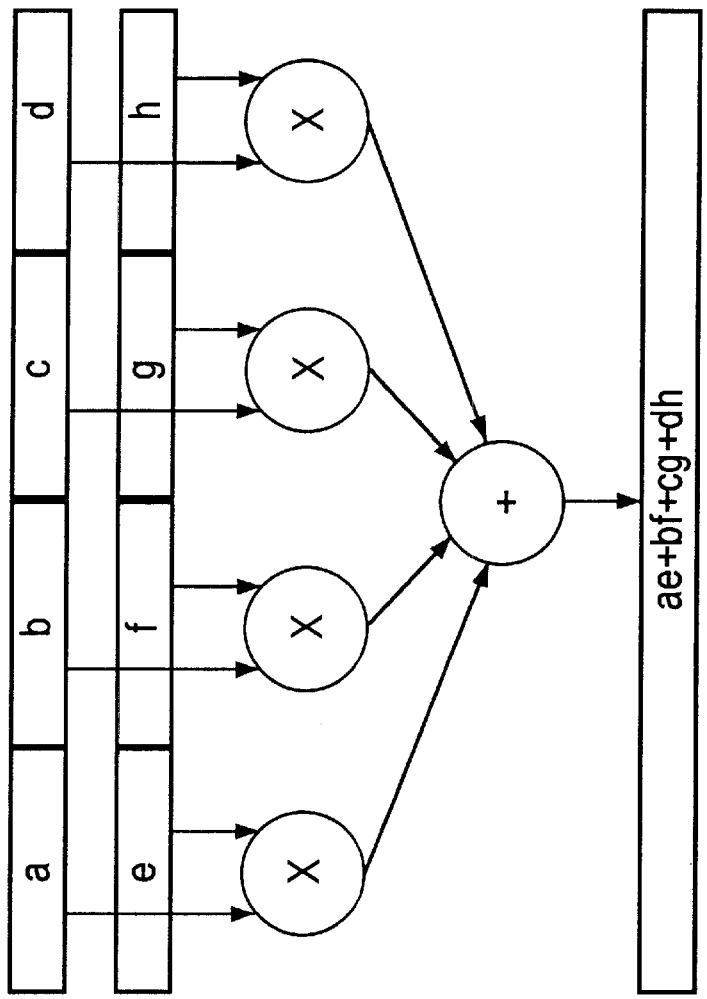
FIGS. 5A and 5B illustrate group fixed-point multiply and sum instructions of the present invention.

A multiplier array processing system is described wherein numerous specific details are set forth, such as word size, data path size, and instruction formats etc., in order to provide a thorough understanding of the present invention. It will be obvious, however, to one skilled in the art that these specific details need not be employed to practice the present invention. In other instances, well known processor control path and data path structures have not been described in detail in order to avoid unnecessarily obscuring the present invention.

FIGS. 1–4 illustrate instructions from the instruction set forth in the parent application, Ser. No. 08/516,036 filed Aug. 16, 1995.

FIGS. 1 and 2 relate to fixed-point multiplication instructions, wherein groups of symbols of 64-bit total size are multiplied together, thereby producing groups of products of 128-bit total size. The individual symbols are of sizes from 1 bit to 64 bits, i.e., 64×1-bit, 32×2-bit, 16×4-bit, 8×8-bit, 4×16-bit, 2×32-bit or 1×64-bit. The products of the multiplication are twice the size of the input symbols, which reflects the size the result must be to avoid fixed-point overflow in the computation of the product.

One measure of the complexity of the instruction is the size of the result. It is preferable to limit the size of the result to 128 bits for each of the instructions, as this reduces the number and width of write ports to register files and the number of gates required to bypass results around the register file.

FIG. 2 illustrates a fixed-point multiply-and-add instruction, in which the product is added to a third value on a symbol-by-symbol basis. The instruction performs twice as many operations per instruction as the instruction shown in FIG. 1, as it performs an add operation for each multiply operation.

FIGS. 3 and 4 illustrate the same operations, as illustrated in FIGS. 1 and 2, respectively, when floating-point operations are specified. In this case, as the size of the product is the same as the size of the input symbol (in this example—128 bits), 128 bits of source operand is allowed. Thus, for equal size of symbols, the floating-point instructions of FIGS. 3–4, perform twice as many operations as the fixed-point instructions of FIGS. 1–2.

There are many applications for the multiply and multiply-and-add instructions of FIGS. 1–4. One application, which is typical of a class of applications, is called FIR (Finite Impulse Response) filters. FIR filters are particularly easy to implement using the multiply-and-add instructions because adjacent results are independent, meaning that they can be computed separately and therefore in parallel. The group multiply-and-add instruction performs the computation for several adjacent results in parallel.

However, one problem that arises with the instruction shown in, for example, FIG. 2, is that the addition operations can suffer overflow, because the result symbols are the same size as the add source operand. This is generally avoided by scaling the values of the symbols so as to avoid overflow (i.e., making the multiplier operand smaller), so that the products which are added together are not larger than can be represented in the result symbol. This scaling results in a limit on the accuracy of the computation, as the multiplier generally has a value which must be rounded off to scale to the required precision.

Accordingly, in order to overcome this limitation, it is a goal of the present invention to provide instructions which perform a greater number of multiplies in a single operation, without increasing the size of the result to be greater than the size of an operand, which in the current example is 128 bits.

FIG. 5A illustrates a novel instruction which satisfies this goal. In accordance with the instruction, which is referred to as a group-fixed-point-multiply-and-sum, two 128-bit operands are divided into groups of bits, forming equal-sized symbols which may have sizes of 1, 2, 4, 8, 16, 32 and 64 bits. The groups of symbols are multiplied together to form a plurality of products, each of which are of twice the size as the operands, and then the products added together. The addition of all the products together reduces the size of the result such that the result size does not exceed 128 bits. Specifically, a 1-bit multiply-and-sum produces 128 1-bit products, which can be represented in as little as 8 bits, since the largest sum is 128; a 2-bit multiply-and-sum produces 64 4-bit products;, each valued 0,1,4, or 9, for which the largest unsigned sum is 576, and the largest signed sum is 64*(−2 to +4)=−128 to 256, which can be represented in as little as 9 bits. In general, an n-bit multiply-and-sum produces 128/n 2n-bit products, which can be represented in $\log_2(128/n)+2n$ bits. For 64-bit symbols the products require 128 bits, and the sum of the two products would require 129 bits; the result is truncated in the same manner that the multiply-and-add operations must truncate the sum of the product with the addend, specifically, by truncating the high-order bit. As such, the group-fixed-point-multiply-and-sum instruction of FIG. 5A can accept two 128 bit groups as operands. Whereas, the group-fixed-point multiply-and-add instruction can accept only two 64-bit groups due to the limit of the total result size of 128 bits.

In fact, for all sizes of symbols from 1–16 bits, the result is no larger than 64-bits, which in some architecture designs is the width of a single register. For symbols of 32 bits, the 4 products are 64 bits each, so a 128-bit result is used, which cannot overflow on the sum operation. For symbols of 64 bits, the 2 products are 128 bits each and nearly all values can be added without overflow. The fact that this instruction takes 128-bit groups rather than 64-bit group means that twice as many multiplies are performed by this instruction, as compared to the instructions illustrated in FIGS. 1 and 2.

More specifically, referring to FIG. 5A, this instruction takes two 128-bit operands specified by ra and rb and multiplies the corresponding groups of the specified size, producing a series of results of twice the specified size. These results are then added together, after sign or zero extending as appropriate, producing a scalar result.

The size of the scalar result is 64 bits when the element size is 16 bits or smaller, and 128 bits when the element size is 32-bits or larger. For 64-bit elements, only two products are summed together, but as the result is only 128 bits, an overflow is still possible (for group signed multiply octlets and sum, the only case that overflows is when all elements equal $-2^{63}$), and an overflow causes truncation on the left and no exception. For element sizes 32-bits or smaller, no overflow can occur.

In summary, the group multiply-and-sum instruction does not result in a reduction of precision, and as a result, provides for greater precision and computation. In addition, the instruction multiplies twice as many operands as the group multiply and add instruction of the parent application, as only a scalar result is required, so that 128-bit result limitation (in the foregoing example) does not restrict the number of operands of the instruction. The 64-bit version of this instruction uses two 64×64 multiplier arrays, and smaller versions uses one-half of the arrays for each halving of operand size.

Figure 5B:
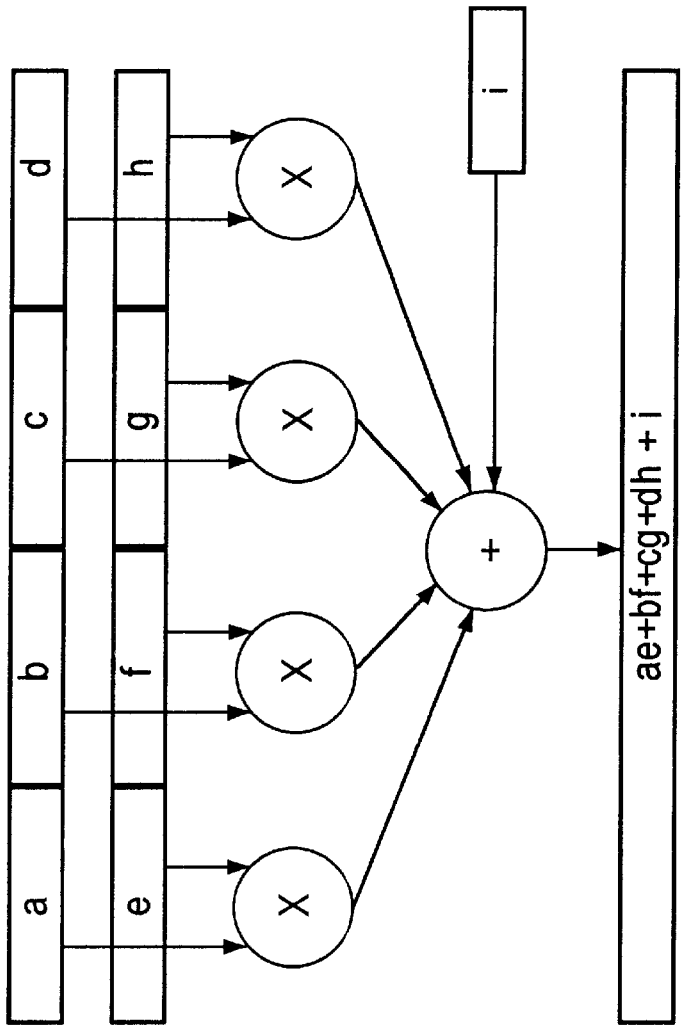

A related instruction, group-fixed-point-multiply-and-sum-and-add, is illustrated in FIG. 5B. As shown, this instruction takes the two 128-bit multiplier and multiplicand operands and divides each operand into groups, multiplies the groups thereby generating a plurality of products, and then sums the plurality of products with a third source operand. The third source operand is labelled "i", and it flows into the summation node. The result of the instruction is ae+bf+cg+dh+i.

Because the 1–16 bit versions of these multiply-and-sum-and-add instructions perform the additions with 64-bit precision, many instances of this instruction may be used repeatedly before the concern about overflow of the addition operations becomes a problem. Specifically, because the sum of the products requires at most 9 bits for the 1-bit version, 10 bits for the 2-bit version, 13 bits for the 4-bit version, 20 bits for the 8-bit version, and 35 bits for the 16-bit version, there are (64−9)=55 to (64−35)=29 additional bits for which the third source operand may repeatedly grow as further products are accumulated into a single register by repetitive use of the multiply-and-sum-and-add instruction. Thus from $2^{55}$ to $2^{29}$ multiply-and-sum-and-add instructions may be performed to a single register without concern of overflow. Thus, the instructions of the present invention permit the multiplier operand to be scaled to use the full precision of the multiplier symbols, which improves the accuracy of computations which use this instruction rather than the multiply-and-add instructions.

The multiply-and-sum and multiply-and-sum-and-add instructions of the present invention are particularly useful for implementing IIR filters (Infinite Impulse Response) filters, in which each output sample is a weighted sum of several previous output values. In such a case, the value of each output sample is dependent on the value computed for each previous output value, so the parallelism available in a FIR filter is not available in the IIR filter. Parallelism of a different form, however, can be used, in that several multiplies of weights (multipliers) with several previous output values can be performed at once, and the summing node itself can be implemented with a great deal of parallelism.

Figure 6:
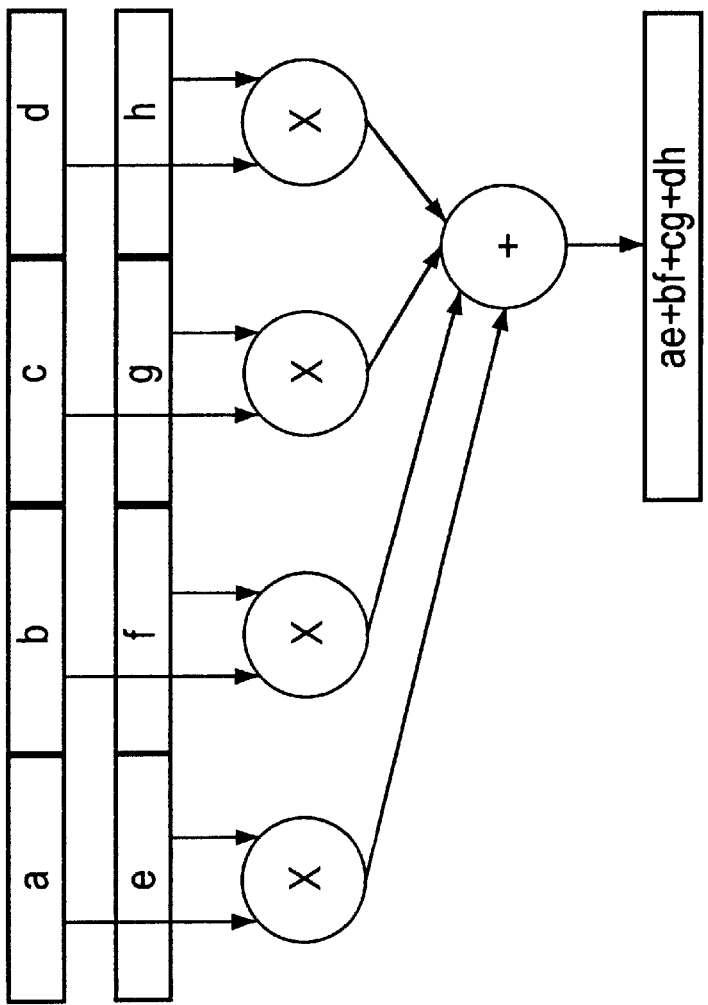
FIG. 6 illustrates a group floating-point multiply and sum instruction of the present invention.

FIG. 6 illustrates a novel group-floating-point-multiply-and-sum instruction. This instruction is useful because the sum operation can be carried out with greater precision than that of the result, when the precision is sufficiently small that more than two products are added together. This greater precision allows a more accurate result to be computed, as there is less rounding of the add result, particularly if the exponent values differ significantly for each of the products. The result does not need to be rounded until the complete sum has been computed.

Figure 7:
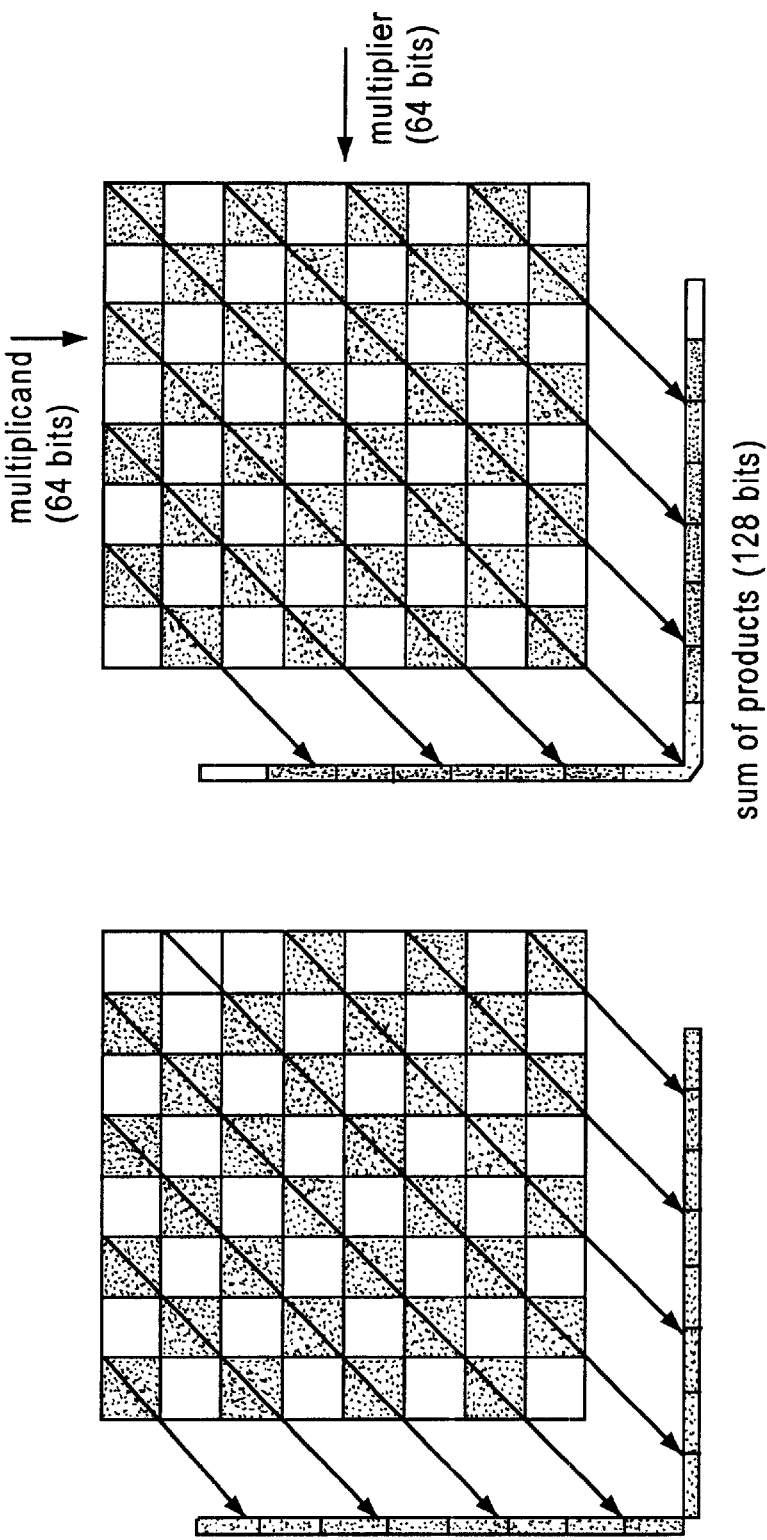
FIG. 7 illustrates one embodiment of a group fixed-point or floating-point convolve instruction of the present invention.

FIG. 7 illustrates one embodiment of a group fixed-point or floating-point convolve instruction of the present invention. There are two subtypes of this instruction, each of which use one-half of a fixed-point multiplier array. The shaded values indicate the location of products which are formed by multiplying multiplicand symbols directed from the top of the array with multiplier symbols directed from the right side of the array. Each of the indicated products connected with a dotted line are added together, yielding sums of products as the result. Each of the unshaded locations in the array are configured to generate zero values into the multipliers product accumulation array. For the fixed-point convolve instruction, the size of the result symbols are twice the size of the multiplier and multiplicand symbols. For a floating-point convolve instruction, the size of the result symbols are the same as the size of the multiplier and multiplicand symbols. As each of the subtypes use one-half of the array, it is apparent that halving the symbol size quadruples the number of multiplies.

Figure 8:
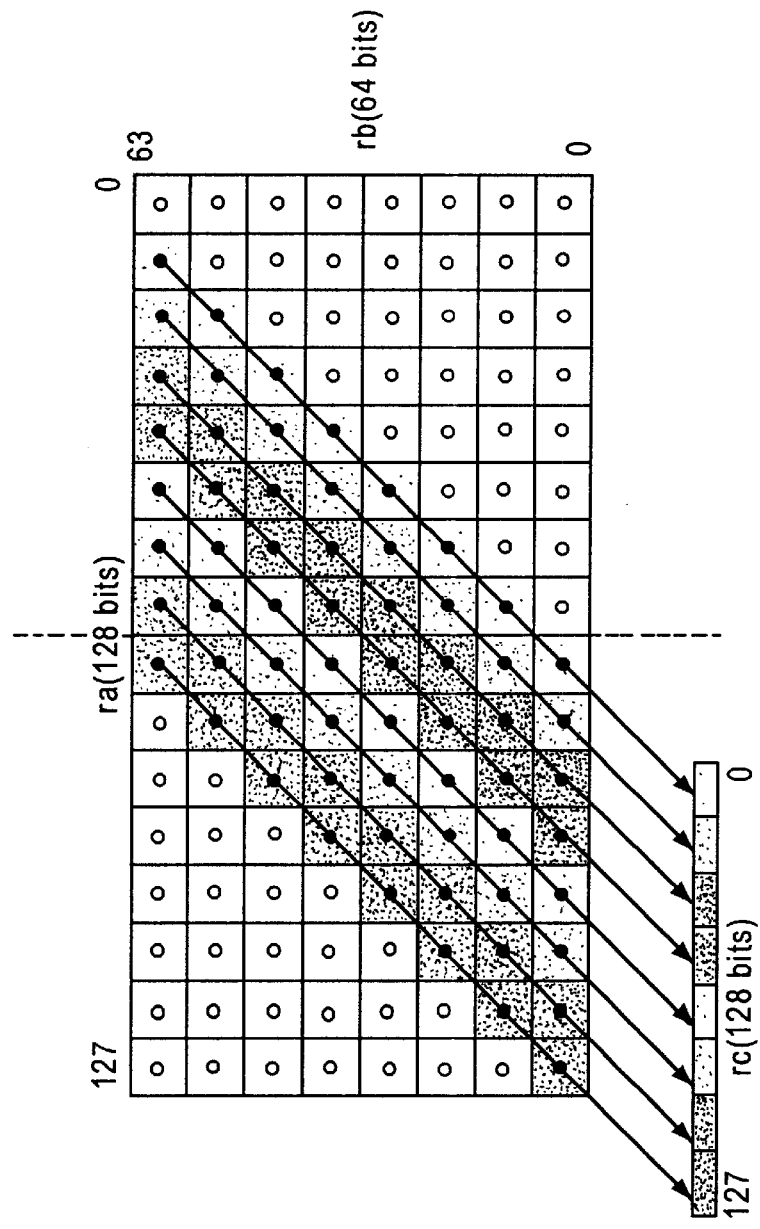
FIG. 8 illustrates a second embodiment of a group fixed-point convolve instruction of the present invention.
Figure 9:
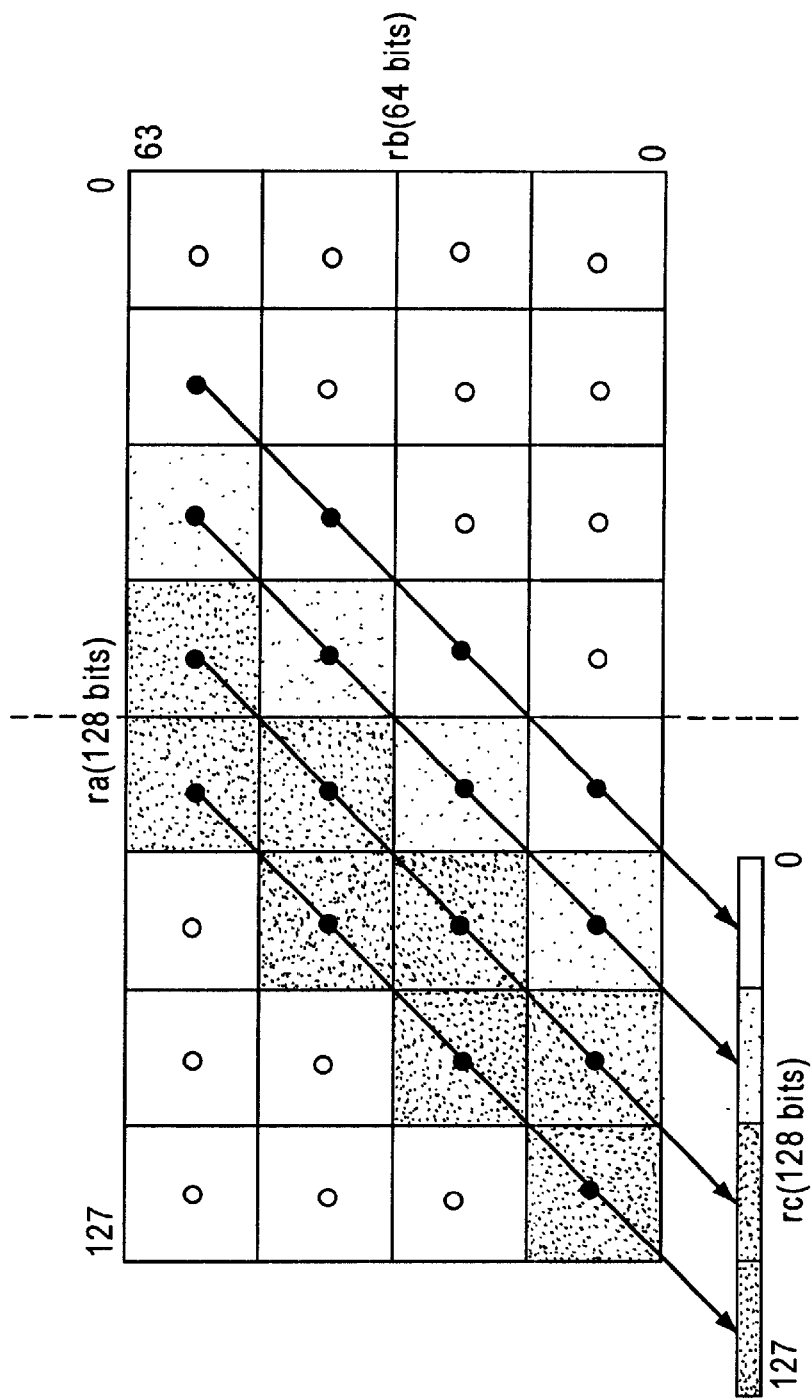
FIG. 9 illustrates an embodiment of a group 16-bit fixed-point convolve instruction of the present invention.

FIG. 8 illustrates a second embodiment of a group fixed-point convolve instruction of the present invention. In accordance with the second embodiment, a 128-bit group of symbols (ra) is multiplied with a 64-bit group of symbols (rb) in the pattern shown, and the resulting products, shown as small black circles, are added together in the pattern shown by the connecting lines, producing a 128-bit group of result symbols (rc) (of twice the size as the operand symbols, as the fixed-point products are twice the size of the multiplier and multiplicand symbols). The instruction illustrated in FIG. 8 is an 8-bit version; a 16-bit version is illustrated in FIG. 9, as the 16-bit version takes 16-bit operand symbols (ra) and (rb), and produces 32-bit result symbols (rc). As in FIG. 7, the products in FIGS. 8 and 9 are formed by multiplying together operands at the locations indicated by the black dots, where the multiplicand operand is directed from above the array, and the multiplier operand is directed from the right of the array.

Figure 10:
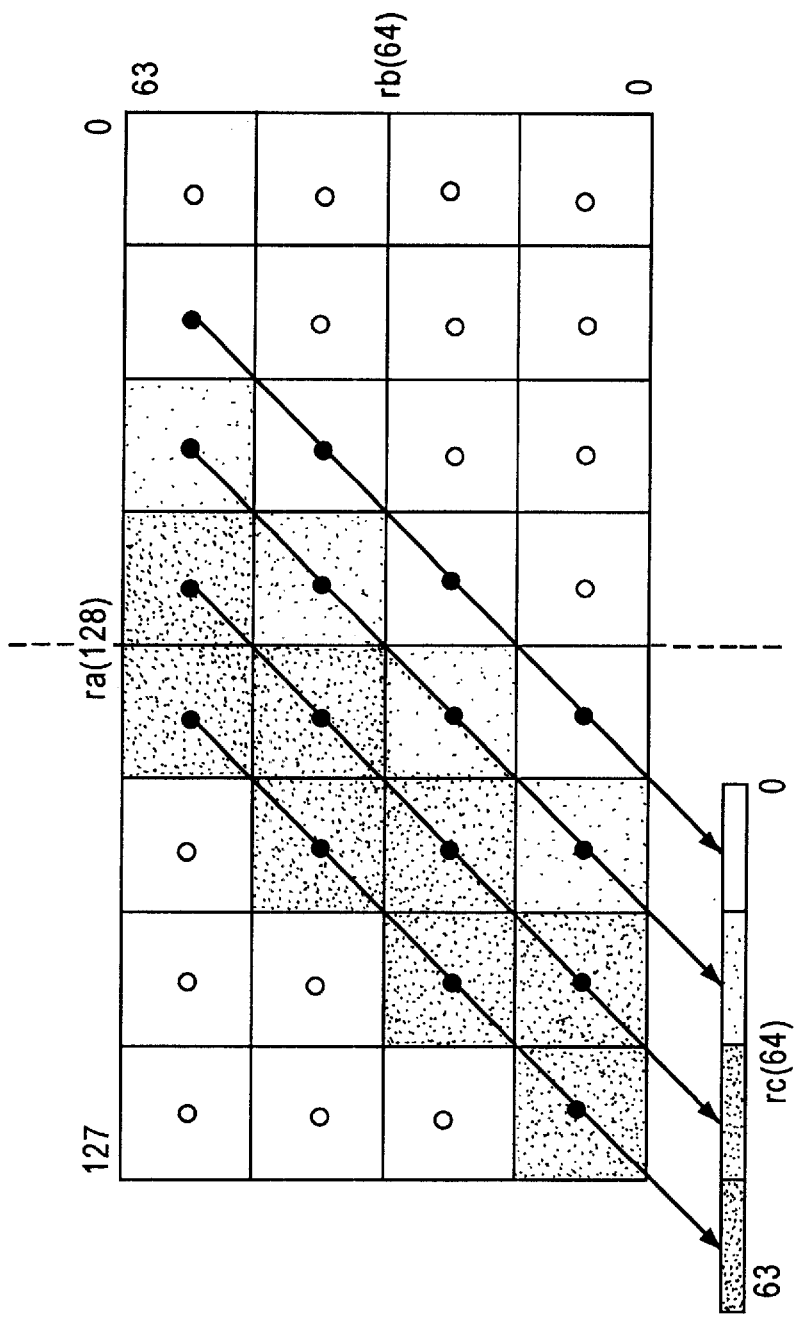
FIG. 10 illustrates a second embodiment of a group floating-point convolve instruction of the present invention.

FIG. 10 illustrates a group-floating-point-convolve, which is the same as the fixed-point convolve in structure, except that the result symbols (rc) are the same size as the operand symbols (ra) and (rb). Thus, the result of this floating-point instruction need be only 64 bits, as the floating-point product symbols are rounded to become the same size in bits as the operand symbols. An extension of this instruction can be made into one that performs four times as many multiplies, as the result size shown here is 64 bits, half of the maximum 128-bit result size limit. Such an extension would have 256 bits of operand ra and 128 bits of operand rb.

In accordance with the foregoing group convolve instructions of the present invention, the efficiency of use of the multiplier array does not decrease with decreasing operand size. In fact, the instruction provides a quadrupling of the number of effective operands each time the operand size is halved.

Referring again to FIG. 8, the group convolve instruction takes a 128-bit operand specified by ra and a 64-bit operand specified by rb, and treating the operands as ordered vectors, performs a convolution on the two vectors, truncating the computation so as to produce a 128-bit result. The result is an ordered vector of twice the specified precision. Overflow may possibly result from the summation of the products.

The group convolve instruction is designed to utilize the summation-tree of the multiplier array in a close approximation to the manner required for a scalar multiply. For this reason the ra operand is specified as 128 bits and the low-order element of the operand is not used. The rb operand uses 64-bit in the particular order required to enable the use of the existing summation tree. The result is 128-bit for fixed-point convolve and 64-bit for floating-point convolve.

As shown in FIG. 8, the result is essentially formed from portions if the multiplier array that are normally added together when performing a 64×64 multiply, although portions of the addition tree must be separated into two parts, and the result either uses both 64×64, multiplier arrays, or uses a single array which can be partitioned to multiply different operands in the upper-left triangular and lower-right triangular portions of a single 64×64 multiplier array.

It is apparent in both FIG. 8 and FIG. 9 that one-half of a 128-bit by 64-bit multiplier array is used by this instruction, and that by dividing the array into two 64-bit by 64-bit arrays in the center of the figures (as shown by dotted lines) and superimposing the two halves, that the portions of the half-arrays which are used in the left half are not used in the right half, and the portions of the half-arrays which are used in the right half are not used in the left half. Thus this instruction can be implemented with a single 64-bit by 64-bit multiplier array with appropriately partitioned operands and accumulation arrays.

Figure 11:
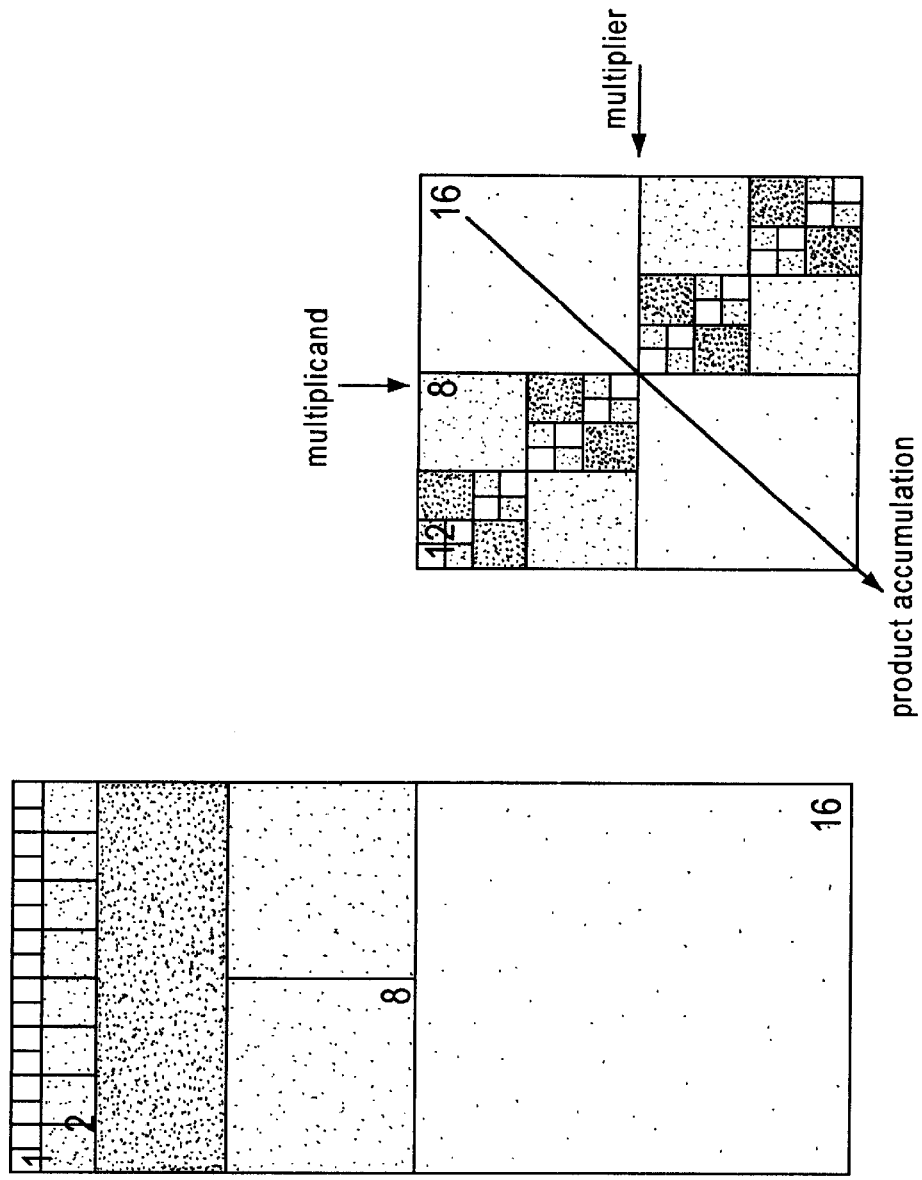
FIG. 11 illustrates how the instructions of FIGS. 1–4 can be produced from partitions of a single multi-precision multiplier array.
Figure 5A:
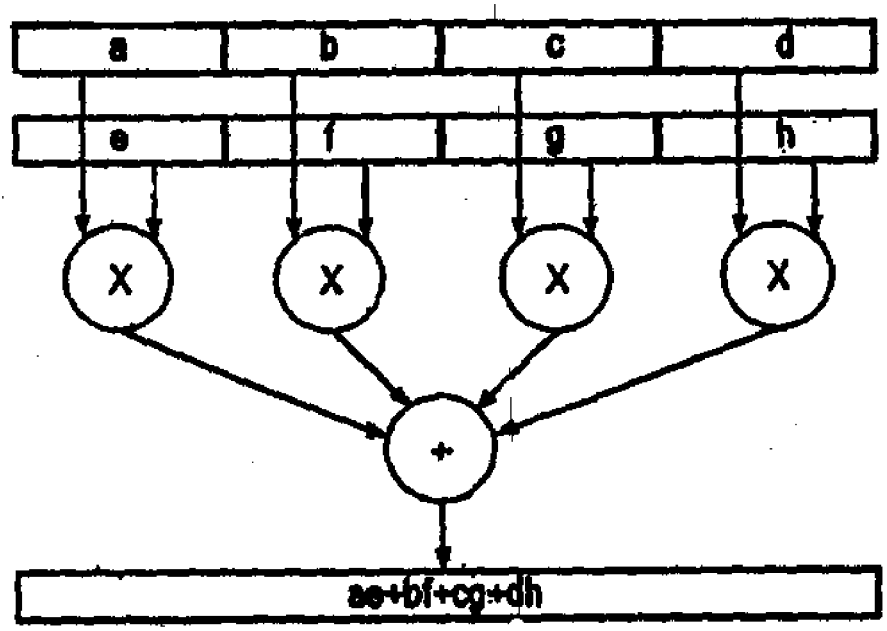
Figure 5B:
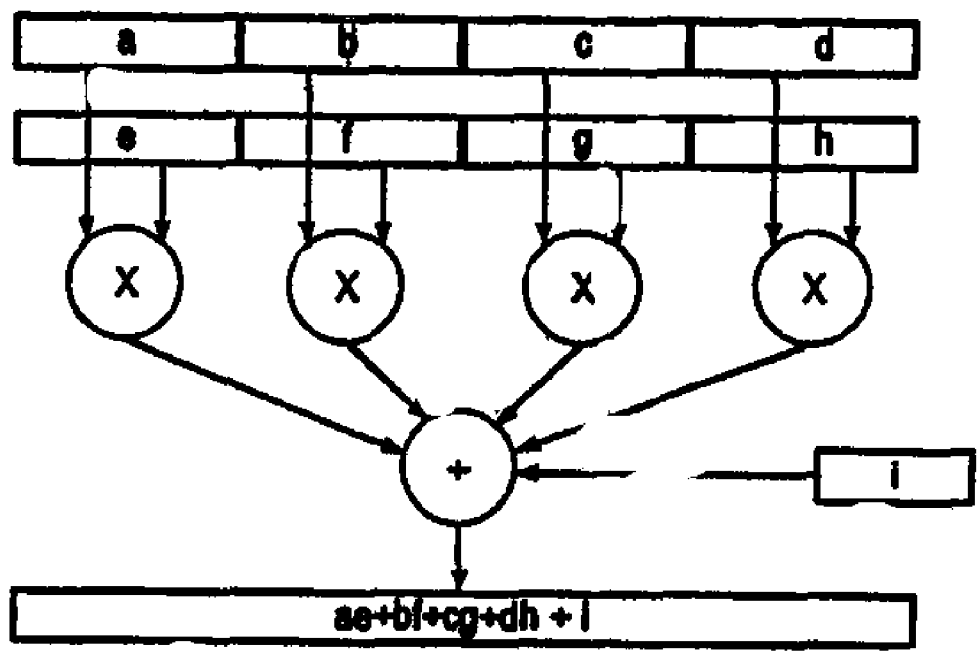

FIG. 11 shows how the multiplies required for group-multiply and group-multiply-and-add instructions can be produced from a single multi-precision structure. As shown, 1×1, 2×2, 4×4, 8×8; and 16×16 multiplies are illustrated; the preferred design extends up through 32×32 and 64×64 multiplies with the same structure or pattern. The smaller multipliers are formed from subsets of the larger multipliers by gating off (forcing to zero) portions of the multiplier and multiplicand array. The resulting products are added together in a classical carry-save multiplier-accumulation tree.

FIG. 12 shows how multiplies required for group-multiply-and-sum and group-multiply-and-sum-and-add instructions can be produced from a single multi-precision structure. As shown, 1×1, 2×2, 4×4, 8×8, and 16×16 multiplies are illustrated; the preferred design extends up through 32×32 and 64×64 multiplies with the same structure or pattern. In the same fashion as FIG. 11, the smaller multipliers are formed from subsets of the larger multipliers by gating off (forcing to zero) portions of the multiplier and multiplicand array. In this case, the gating is in the reverse of the pattern of FIG. 11, so that each of the products so formed are added together by the multiplier-accumulation tree.

FIGS. 7–10 also illustrate the product and accumulation patterns indicated for each of the two embodiments of group-convolve instructions, producing these operations from a single-multi-precision structure as previously detailed.

The following operational codes and psuedo-code of the foregoing instructions are intended to assist in the understanding thereof.

Group These instructions take two operands, perform a group of operations on partitions of bits in the operands, and catenate the results together.

| Operation codes | |
|---|---|
| G.CONVOLVE.1[1] | Group signed convolve bits |
| G.CONVOLVE.2 | Group signed convolve pecks |
| G.CONVOLVE.4 | Group signed convolve nibbles |
| G.CONVOLVE.8 | Group signed convolve bytes |
| G.CONVOLVE.16 | Group signed convolve doubles |
| G.CONVOLVE.32 | Group signed convolve quadlets |
| G.MUL.1[2] | Group signed multiply bits |
| G.MUL.2 | Group signed multiply pecks |
| G.MUL.4 | Group signed multiply nibbles |
| G.MUL.8 | Group signed multiply bytes |
| G.MUL.16 | Group signed multiply doublets |
| G.MUL.32 | Group signed multiply quadlets |
| G.MUL.64.[3] | Group signed multiply octlets |

| -continued | |
|---|---|
| G.MUL.SUM.1[4] | Group signed multiply bits and sum |
| G.MUL.SUM.2 | Group signed multiply pecks and sum |
| G.MUL.SUM.4 | Group signed multiply nibbles and sum |
| G.MUL.SUM.8 | Group signed multiply bytes and sum |
| G.MUL.SUM.16 | Group signed multiply doublets and sum |
| G.MUL.SUM.32 | Group signed multiply quadlets and sum |
| G.MUL.SUM.64 | Group signed multiply octlets and sum |
| G.U.CONVOLVE.2 | Group unsigned convolve pecks |
| G.U.CONVOLVE.4 | Group unsigned convolve nibbles |
| G.U.CONVOLVE.8 | Group unsigned convolve bytes |
| G.U.CONVOLVE.16 | Group unsigned convolve doublets |
| G.U.CONVOLVE.32 | Group unsigned convolve quadlets |
| G.U.MUL.2 | Group unsigned multiply pecks |
| G.U.MUL.4 | Group unsigned multiply nibbles |
| G.U.MUL.8 | Group unsigned multiply bytes |
| G.U.MUL.16 | Group unsigned multiply doublets |
| G.U.MUL.32 | Group unsigned multiply quadlets |
| G.U.MUL.64[5] | Group unsigned multiply octlets. |
| G.U.MUL.SUM.2 | Group unsigned multiply pecks and sum |
| G.U.MUL.SUM.4 | Group unsigned multiply nibbles and sum |
| G.U.MUL.SUM.8 | Group unsigned multiply bytes and sum |
| G.U.MUL.SUM.16 | Group unsigned multiply doublets and sum |
| G.U.MUL.SUM.32 | Group unsigned multiply quadlets and sum |
| G.U.MUL.SUM.64 | Group unsigned multiply octlets and sum |

| -continued | | | |
|---|---|---|---|
| class | op | | size |
| signed multiply | MUL CONVOLVE | MUL.SUM | 1 2 4 8 16 32 64 |
| unsigned multiply | U.MUL U. CONVOLVE | U.MUL.SUM | 2 4 8 16 32 64 |

| Format |
|---|
| G.op size rc = ra,rb |

| 31 | 24 | 23 | 18 | 17 | 12 | 11 | 6 | 5 | 0 |
|---|---|---|---|---|---|---|---|---|---|
| G.size | | ra | | rb | | rc | | op | |
| 8 | | 6 | | 6 | | 6 | | 6 | |

[1] G.CONVOLVE.1 is used as the encoding for G.U.CONVOLVE.1.
[2] G.MUL.1 is used as the encoding for G.UMUL.1.
[3] G.MUL.64 is used as the encoding for G.CONVOLVE.64.
[4] G.MUL.SUM.1 is used as the encoding for G.UMUL.SUM.1.
[5] G.MUL.SUM.1 is used as the encoding for G.UMUL.SUM.1.

Description

Two values are taken from the contents of registers or register pairs specified by ra and rb. The specified operation is performed, and the result is placed in the register or register pair specified by rc. A reserved instruction exception occurs for certain operations if $rc_0$ is set, and for certain operations if $ra_0$ or $rb_0$ is set.

| Definition |
|---|

```
def Group(op,size,ra,rb,rc)
    case op of
        G.MUL, G.U.MUL:
            a ← RegRead(ra, 64)
            b ← RegRead(rb, 64)
        G.MULSUM, G.U.MULSUM:
            a ← RegRead(ra, 128)
            b ← RegRead(rb, 128)
        G.CONVOLVE, G.U.CONVOLVE:
            a ← RegRead(ra, 128)
            b ← RegRead(rb, 64)
    endcase
    case op of
        G.MUL:
            for i ← 0 to 64-size by size
                c2*(i+size)−1..2*i ← (asize_{size−1+i} ∥ asize−1+i..i)*(bsize_{size−1+i} ∥ bsize−1+i..i)
            endfor
        G.U.MUL:
            for i ← 0 to 64-size by size
                c2*(i+size)−1..2*i ← (0size ∥ a_{size−1+i..i})*(0size ∥ b_{size−1+i..i})
            endfor
        G.MUL.SUM:
            csize ← (size²16) ? 64 : 128
            p[0] ← 0csize
            for i ← 0 to 128-size by size
                p[i+size] ← p[i] + (acsize−size_{size−1+i} ∥ asize−1+i..i)*(bcsize−size_{size−1+i} ∥ bsize−1+i..i)
            endfor
            c ← p[128]
        G.U.MUL.SUM:
            csize ← (size²16) ? 64 : 128
            p[0] ← 0csize
            for i ← 0 to 128-size by size
                p[i+size] ← p[i] + (0csize−size ∥ a_{size−1+i..i})*(0csize−size ∥ _{size−1+i..i})
            endfor
            c ← p[128]
        G.CONVOLVE:
            p[0]← 0¹²⁸
            for j ← 0 to 64-size by size
                for i ← 0 to 64-size by size
                    p[j+size] 2*(i+size)−1..2*i ← p[j]2*(i+size)−1..2*i +
                        (asize_{size−1+i+64−j} ∥ asize−1+i+64−j..i+64−j)*(bsize_{size−1+j} ∥ bsize−1+j..j)
                endfor
            endfor
            c ← p[64]
```

-continued

| Definition |
|---|
| G.U.CONVOLVE:<br>    p[0] ← $0^{128}$<br>    for j ← 0 to 64-size by size<br>        for i ← 0 to 64-size by size<br>            p[j+size]2*(i+size)−1..2*i ← p[j] 2*(i+size)−1..2*i +<br>              ($0^{size}$ ‖ $a_{size-1+i+64-j}$)*($0^{size}$ ‖ $b_{size-1+j..j}$)<br>        endfor<br>    endfor<br>    c ← p[64]<br>endcase<br>case op of<br>    G.MUL, G.UMUL, G.CONVOLVE, G.U.CONVOLVE:<br>        RegWrite(rc, 128, c)<br>    G.MUL.SUM, G.U.MUL.SUM:<br>        RegWrite(rc, csize, c)<br>endcase<br>enddef |

As stated above, the present invention provides important advantages over the prior art. Most importantly, the present invention optimizes both system performance and overall power efficiency, thereby overcoming significant disadvantages suffered by prior art devices as detailed above.

Thus, a multiplier array processing system is described. Although the elements of the present invention have been described in conjunction with a certain embodiment, it is appreciated that the invention may be implemented in a variety of other ways. Consequently, it is to be understood that the particular embodiment shown and described by way of illustration are in no way intended to be considered limiting. Reference to the details of these embodiments is not intended to limit the scope of the claims which themselves recite only those features regarded as essential to the invention.

What is claimed is:

1. A method for performing a group-multiply-and-sum instruction, said method comprising the steps of:

partitioning each of a plurality of operands into a plurality of symbols, said operands and each of said symbols having a predefined bit width;

multiplying symbols of a first operand with symbols of a second operand, each of such multiplications producing a product; and adding each product so as to produce a single scalar result, said scalar result capable of being represented by a bit width which is equal to or less than said predefined bit width of said operands without a reduction in the accuracy of said result.

2. The method for performing a group-multiply-and-sum instruction according to claim 1, wherein the instruction comprises a fixed-point arithmetic operation.

3. The method for performing a group-multiply-and-sum instruction according to claim 1, further comprising:

including a third operand in the addition of said products.

4. The method of claim 1, wherein said operands have a first bit width and said symbols have a second bit width, said second bit width being dynamically variable, and said scalar result is capable of being represented by a bit width which is equal to or less than said first defined bit width.

5. The method for performing a group-multiply-and-sum instruction according to claim 4, wherein the instruction comprises a floating-point arithmetic operation.

6. A method for performing a group-multiply-sum-and-add instruction, said method comprising the steps of:

partitioning each of a plurality of operands into a plurality of symbols, said operands and each of said symbols having a predefined bit width;

multiplying symbols of a first operand with symbols of a second operand, each of such multiplications producing a product; and adding each product and a third operand so as to produce a single scalar result, said scalar result capable of being represented by a bit width which is equal to or less than said predefined bit width of said operands without a reduction in the accuracy of said result.

7. The method for performing a group-multiply-sum-and-add instruction according to claim 6, wherein the instruction comprises a fixed-point arithmetic operation.

8. The method of claim 6, wherein said operands have a first bit width and said symbols have a second bit width, said second bit width being dynamically variable, and said scalar result is capable of being represented by a bit width which is equal to or less than said first defined bit width.

9. The method for performing a group-multiply-sum-and-add instruction according to claim 8, wherein the instruction comprises a floating-point arithmetic operation.

10. A multiplier processing system for performing a group-convolve instruction, said system comprising:

means for partitioning each of a plurality of operands into a plurality of symbols, said operands having a first defined bit width and said symbols having a second defined bit width, said second defined bit width being dynamically variable;

means for multiplying a selection of symbols of a first operand with a selection of symbols of a second operand, each of such multiplications producing a selected product, said selection determined by the indices of the symbols within the first and second operand as to perform a convolution; and means for adding a plurality of selected products so as to produce a plurality of result symbols, said result symbols provided to a plurality of partitioned fields of a result operand.

11. The multiplier processing system for performing a group-convolve instruction according to claim 10, wherein the instruction comprises a fixed-point arithmetic operation.

12. The multiplier processing system for performing a group-convolve instruction according to claim 10, wherein the instruction comprises a floating-point arithmetic operation.

13. The multiplier processing system for performing a group-convolve instruction according to claim 10, wherein the summation-tree of the multiplier array is utilized in a close approximation to the manner required for a scalar multiply.

14. The multiplier processing system for performing a group-convolve instruction according to claim 10, wherein the multiplier array required for a scalar multiply comprises an accumulation array partitioned to form a plurality of sums of products.

15. A method for performing a group-multiply instruction in a general purpose, multiple precision parallel operation programmable media processor, said method comprising:

partitioning first and second registers into a plurality of floating point operands, said floating point operands having a defined bit width, wherein said defined bit width is dynamically variable;

multiplying, in parallel, said plurality of floating point operands in said first register by said plurality of floating point operands in said second, each of such multiplications producing a floating point product to provide a plurality of floating point products, each of said floating point products being capable of being represented by a defined bit width which is equal to said defined bit width of said operands; and providing said plurality of floating point products to a plurality of partitioned fields of a result.

16. The method of claim 15 wherein each of said first and second registers are partitionable into four fields to hold four floating-point operands in parallel.

17. The method of claim 15 wherein said first and second registers are 128 bit registers.

18. The method of claim 15 wherein the result is returned to a result register which is a different register than either the first or second operand registers.

19. A general purpose, multiple precision parallel operation programmable media processor for performing a group multiply instruction, said processor comprising:

first and second registers partitioned into a plurality of floating point operands, said floating point operands having a defined bit width and said defined bit width being dynamically variable;

a multiplier, configured to multiply, in parallel, said plurality of floating point operands in said first register by said plurality of floating point operands in said second register, each of such multiplications producing a floating point product to provide a plurality of floating point products, each of said floating point products being capable of being represented by a defined bit width which is equal to said defined bit width of said operands; and a result having a plurality of partitioned fields for receiving said plurality of floating point products.

20. The processor of claim 19 wherein each of said first and second registers are partitionable into four fields to hold four floating-point operands in parallel.

21. The processor of claim 19 wherein said first and second registers are 128 bit registers.

22. The processor of claim 19 further comprising a multiplier configured to group multiply a plurality of fixed point operands in parallel.

23. The processor of claim 19 wherein the result is returned to a result register which is a different register than either the first or second operand registers.

* * * * *

UNITED STATES PATENT AND TRADEMARK OFFICE
CERTIFICATE OF CORRECTION

PATENT NO.     : 6,584,482 B1
DATED          : June 24, 2003
INVENTOR(S)    : Craig C. Hansen et al.

It is certified that error appears in the above-identified patent and that said Letters Patent is hereby corrected as shown below:

The title page showing the illustrative figure should be deleted to be replaced with the attached title page.

Drawing sheet, consisting of Figs. 5A-5B, should be deleted to be replaced with the drawing sheet, consisting of Figs. 5A-5B, as shown on the attached page.

Signed and Sealed this

Twelfth Day of April, 2005

JON W. DUDAS
*Director of the United States Patent and Trademark Office*

(12) United States Patent
Hansen et al.

(10) Patent No.: US 6,584,482 B1
(45) Date of Patent: * Jun. 24, 2003

(54) MULTIPLIER ARRAY PROCESSING SYSTEM WITH ENHANCED UTILIZATION AT LOWER PRECISION

(75) Inventors: Craig C. Hansen, Los Altos, CA (US); Henry Massalin, Sunnyvale, CA (US)

(73) Assignee: Microunity Systems Engineering, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/377,182

(22) Filed: Aug. 19, 1999

Related U.S. Application Data

(63) Continuation of application No. 08/857,596, filed on May 16, 1997, now Pat. No. 5,953,241, which is a continuation-in-part of application No. 08/516,036, filed on Aug. 16, 1995, now Pat. No. 5,742,840.
(60) Provisional application No. 60/021,132, filed on May 17, 1996.

(51) Int. Cl.⁷ .............................. G06F 17/15
(52) U.S. Cl. ............... 708/523; 708/420; 708/501; 708/603; 712/221
(58) Field of Search ................ 708/523, 501, 708/319, 603, 420; 712/221

(56) References Cited

U.S. PATENT DOCUMENTS

| | | | |
|---|---|---|---|
| 4,876,660 A | 10/1989 | Owen et al. | 364/764 |
| 4,956,801 A | 9/1990 | Priem et al. | 364/748 |
| 4,969,118 A | 11/1990 | Montoye et al. | 364/748 |
| 5,032,865 A | 7/1991 | Schlunt | 364/750.5 |
| 5,408,581 A | 4/1995 | Suzuki et al. | 364/724.16 |
| 5,500,811 A | 3/1996 | Corry | 364/724.16 |

*Primary Examiner*—David H. Malzahn
(74) *Attorney, Agent, or Firm*—McDermott, Will & Emery

(57) ABSTRACT

A multiplier array processing system which improves the utilization of the multiplier and adder array for lower-precision arithmetic is described. New instructions are defined which provide for the deployment of additional multiply and add operations as a result of a single instruction, and for the deployment of greater multiply and add operands as the symbol size is decreased.

23 Claims, 13 Drawing Sheets

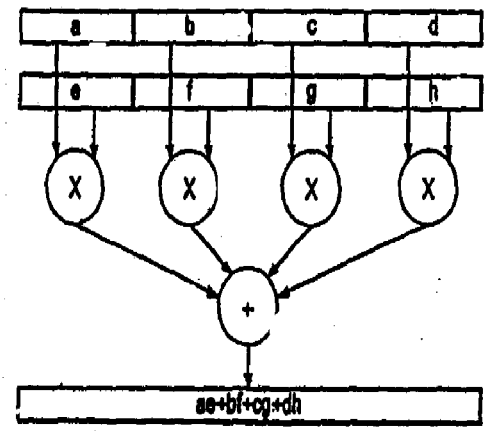

Group Fixed-point Multiply and Sum
- Group Multiply and Sum: 64/128 bits := 128*128 bits
- symbol sizes of 1, 2, 4, 8, 16, 32, 64 bits

Group Fixed-point Multiply and Sum

- Group Multiply and Sum: 64/128 bits := 128*128 bits
  - symbol sizes of 1, 2, 4, 8, 16, 32, 64 bits

(12) EX PARTE REEXAMINATION CERTIFICATE (6490th)
United States Patent
Hansen et al.

(10) Number: US 6,584,482 C1
(45) Certificate Issued: *Oct. 28, 2008

(54) MULTIPLIER ARRAY PROCESSING SYSTEM WITH ENHANCED UTILIZATION AT LOWER PRECISION

(75) Inventors: Craig C. Hansen, Los Altos, CA (US); Henry Massalin, Sunnyvale, CA (US)

(73) Assignee: Microunity Systems Engineering, Inc., Sunnyvale, CA (US)

Reexamination Request:
No. 90/007,532, May 4, 2005

Reexamination Certificate for:
Patent No.: 6,584,482
Issued: Jun. 24, 2003
Appl. No.: 09/377,182
Filed: Aug. 19, 1999

(*) Notice: This patent is subject to a terminal disclaimer.

Certificate of Correction issued Apr. 12, 2005.

Related U.S. Application Data

(63) Continuation of application No. 08/857,596, filed on May 16, 1997, now Pat. No. 5,953,241, which is a continuation-in-part of application No. 08/516,036, filed on Aug. 16, 1995, now Pat. No. 5,742,840.
(60) Provisional application No. 60/021,132, filed on May 17, 1996.

(51) Int. Cl.
| | | |
|---|---|---|
| G06F 12/10 | (2006.01) | |
| G06F 12/08 | (2006.01) | |
| G06F 9/30 | (2006.01) | |
| G06F 9/302 | (2006.01) | |
| G06F 15/78 | (2006.01) | |
| G06F 15/76 | (2006.01) | |
| G06F 9/38 | (2006.01) | |
| H04N 7/52 | (2006.01) | |
| H04N 7/58 | (2006.01) | |

(52) U.S. Cl. ............... 708/523; 375/E7.268; 708/420; 708/501; 708/603; 711/E12.02; 711/E12.061; 712/221; 712/E9.016; 712/E9.017; 712/E9.021; 712/E9.028; 712/E9.055; 712/E9.062; 712/E9.063

(58) Field of Classification Search .............. 708/523, 708/420, 501, 603
See application file for complete search history.

(56) References Cited

U.S. PATENT DOCUMENTS

| | | | |
|---|---|---|---|
| 3,814,924 A | | 6/1974 | Tate |
| 3,863,057 A | * | 1/1975 | Siems ............... 708/603 |
| 3,916,388 A | | 10/1975 | Shimp |
| 4,509,119 A | | 4/1985 | Gumaer |
| 4,527,232 A | | 7/1985 | Bechtolsheim |
| 4,583,199 A | | 4/1986 | Boothroyd |
| 4,685,076 A | | 8/1987 | Yoshida |
| 4,796,232 A | | 1/1989 | House |
| 4,803,621 A | | 2/1989 | Kelly |
| 4,814,976 A | | 3/1989 | Hansen |
| 4,825,361 A | | 4/1989 | Omoda |

(Continued)

FOREIGN PATENT DOCUMENTS

CA       1 323 451 C     10/1993

(Continued)

OTHER PUBLICATIONS

U.S. Appl. No. 08/340,740, filed Nov. 16, 1994, Wulf.
The 82C302 Page/Interleave Memory Controller.

(Continued)

*Primary Examiner*—Woo H Choi

(57) ABSTRACT

A multiplier array processing system which improves the utilization of the multiplier and adder array for lower-precision arithmetic is described. New instructions are defined which provide for the deployment of additional multiply and add operations as a result of a single instruction, and for the deployment of greater multiply and add operands as the symbol size is decreased.

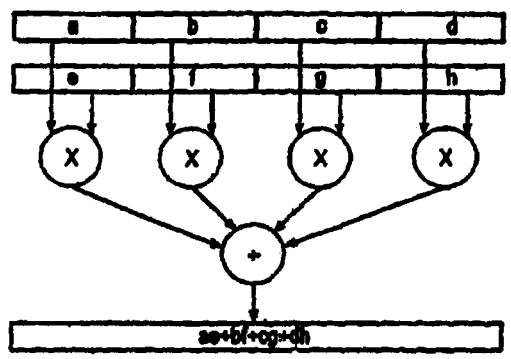

U.S. PATENT DOCUMENTS

| | | | |
|---|---|---|---|
| 4,825,401 A | 4/1989 | Ikumi |
| 4,833,599 A | 5/1989 | Colwell |
| 4,843,543 A | 6/1989 | Isobe |
| 4,852,098 A | 7/1989 | Brechard |
| 4,875,161 A | 10/1989 | Lahti |
| 4,876,660 A | 10/1989 | Owen et al. |
| 4,884,190 A | 11/1989 | Ngai |
| 4,888,679 A | 12/1989 | Fossum |
| 4,888,682 A | 12/1989 | Ngai |
| 4,899,272 A | 2/1990 | Fung |
| 4,910,667 A | 3/1990 | Tanaka |
| 4,920,477 A | 4/1990 | Colwell |
| 4,924,375 A | 5/1990 | Fung |
| 4,937,791 A | 6/1990 | Steele |
| 4,943,919 A | 7/1990 | Aslin |
| 4,949,250 A | 8/1990 | Bhandarkar |
| 4,949,294 A | 8/1990 | Wambergue |
| 4,953,073 A | 8/1990 | Moussouris |
| 4,953,119 A | 8/1990 | Wong |
| 4,956,801 A | 9/1990 | Priem et al. |
| 4,959,779 A | 9/1990 | Weber |
| 4,969,118 A | 11/1990 | Montoye et al. |
| 4,980,817 A | 12/1990 | Fossum |
| 5,008,812 A | 4/1991 | Bhandarkar |
| 5,032,865 A | 7/1991 | Schlunt |
| 5,034,917 A | 7/1991 | Bland |
| 5,040,153 A | 8/1991 | Fung |
| 5,043,867 A | 8/1991 | Bhandarkar |
| 5,051,889 A | 9/1991 | Fung |
| 5,081,698 A | 1/1992 | Kohn |
| 5,113,506 A | 5/1992 | Moussouris |
| 5,113,521 A | 5/1992 | McKeen |
| 5,155,816 A | 10/1992 | Kohn |
| 5,157,388 A | 10/1992 | Kohn |
| 5,161,247 A | 11/1992 | Murakami |
| 5,168,547 A | 12/1992 | Miller |
| 5,168,573 A | 12/1992 | Fossum |
| 5,179,651 A | 1/1993 | Taaffe |
| 5,179,667 A | 1/1993 | Iyer |
| 5,187,796 A | 2/1993 | Wang |
| 5,197,130 A | 3/1993 | Chen |
| 5,201,043 A | 4/1993 | Crawford |
| 5,208,914 A | 5/1993 | Wilson |
| 5,212,777 A | 5/1993 | Gove |
| 5,231,646 A | 7/1993 | Heath |
| 5,233,690 A | 8/1993 | Sherlock |
| 5,235,536 A * | 8/1993 | Matsubishi et al. ......... 708/524 |
| 5,241,636 A | 8/1993 | Kohn |
| 5,243,551 A * | 9/1993 | Knowles et al. ............. 708/603 |
| 5,245,564 A | 9/1993 | Quek |
| 5,253,342 A | 10/1993 | Blount |
| 5,256,994 A | 10/1993 | Langendorf |
| 5,260,889 A | 11/1993 | Palaniswami |
| 5,265,213 A | 11/1993 | Weiser |
| 5,268,995 A | 12/1993 | Diefendorff |
| 5,278,974 A | 1/1994 | Lemmon |
| 5,280,598 A | 1/1994 | Osaki et al. |
| 5,287,327 A | 2/1994 | Takasugi |
| 5,301,278 A | 4/1994 | Bowater |
| 5,303,364 A | 4/1994 | Mayer |
| 5,327,369 A | 7/1994 | Ashkenazi |
| 5,327,570 A | 7/1994 | Foster et al. |
| 5,339,276 A | 8/1994 | Takasugi |
| 5,347,481 A | 9/1994 | Williams |
| 5,347,643 A | 9/1994 | Kondo et al. |
| 5,357,606 A | 10/1994 | Adams |
| 5,361,370 A | 11/1994 | Sprague |
| 5,367,705 A | 11/1994 | Sites |
| 5,371,772 A | 12/1994 | Al-Khairi |
| 5,375,208 A | 12/1994 | Pitot |
| 5,390,135 A | 2/1995 | Lee |
| 5,408,581 A | 4/1995 | Suzuki et al. |
| 5,410,669 A | 4/1995 | Biggs |
| 5,410,682 A | 4/1995 | Sites |
| 5,412,728 A | 5/1995 | Besnard et al. |
| 5,416,743 A | 5/1995 | Allan |
| 5,424,967 A | 6/1995 | Lee |
| 5,426,600 A | 6/1995 | Nakagawa |
| 5,430,660 A | 7/1995 | Lueker et al. |
| 5,430,676 A | 7/1995 | Ware |
| 5,430,688 A | 7/1995 | Takasugi |
| 5,434,817 A | 7/1995 | Ware |
| 5,440,713 A | 8/1995 | Lin |
| 5,442,799 A | 8/1995 | Murakami |
| 5,446,696 A | 8/1995 | Ware |
| 5,448,509 A | 9/1995 | Lee |
| 5,450,130 A | 9/1995 | Foley |
| 5,467,131 A | 11/1995 | Bhaskaran |
| 5,471,628 A | 11/1995 | Phillips |
| 5,477,181 A | 12/1995 | Li |
| 5,477,543 A | 12/1995 | Purcell |
| 5,487,024 A | 1/1996 | Girardeau, Jr. |
| 5,499,385 A | 3/1996 | Farmwald |
| 5,500,811 A | 3/1996 | Corry |
| 5,511,024 A | 4/1996 | Ware |
| 5,513,327 A | 4/1996 | Farmwald |
| 5,513,366 A | 4/1996 | Agarwal |
| 5,515,520 A | 5/1996 | Hatta |
| 5,521,856 A | 5/1996 | Shiraishi |
| 5,521,879 A | 5/1996 | Takasugi |
| 5,522,054 A | 5/1996 | Gunlock |
| 5,522,085 A * | 5/1996 | Harrison et al. ................ 712/32 |
| 5,530,960 A | 6/1996 | Parks |
| 5,533,185 A | 7/1996 | Lentz |
| 5,537,606 A | 7/1996 | Byrne |
| 5,541,865 A | 7/1996 | Ashkenazi |
| 5,577,236 A | 11/1996 | Johnson |
| 5,586,070 A | 12/1996 | Purcell |
| 5,590,350 A | 12/1996 | Guttag et al. |
| 5,590,365 A | 12/1996 | Ide |
| 5,600,814 A | 2/1997 | Gahan et al. |
| 5,602,994 A | 2/1997 | Ferron |
| 5,615,355 A | 3/1997 | Wagner |
| 5,636,351 A | 6/1997 | Lee |
| 5,638,534 A | 6/1997 | Mote |
| 5,640,528 A | 6/1997 | Harney |
| 5,649,142 A | 7/1997 | Lavelle |
| 5,654,769 A | 8/1997 | Ohara |
| 5,659,782 A | 8/1997 | Senter |
| 5,666,298 A | 9/1997 | Peleg |
| 5,666,494 A | 9/1997 | Mote |
| 5,673,321 A | 9/1997 | Lee |
| 5,680,338 A | 10/1997 | Agarwal |
| 5,701,434 A | 12/1997 | Nakagawa |
| 5,717,639 A | 2/1998 | Williams |
| 5,719,964 A * | 2/1998 | Linzer et al. ................. 382/250 |
| 5,721,892 A | 2/1998 | Peleg et al. |
| 5,732,236 A | 3/1998 | Nguyen |
| 5,734,874 A | 3/1998 | Van Hook |
| 5,742,840 A | 4/1998 | Hansen et al. |
| 5,758,176 A | 5/1998 | Agarwal et al. |
| 5,768,546 A | 6/1998 | Kwon |
| 5,793,661 A | 8/1998 | Dulong |
| 5,801,975 A | 9/1998 | Thayer |
| 5,805,912 A | 9/1998 | Johnson |
| 5,812,829 A | 9/1998 | Ito |
| 5,819,101 A | 10/1998 | Peleg |
| 5,825,677 A | 10/1998 | Agarwal |
| 5,826,106 A | 10/1998 | Pang |
| 5,828,869 A | 10/1998 | Johnson |
| 5,872,965 A | 2/1999 | Petrick |

| | | |
|---|---|---|
| 5,881,275 A | 3/1999 | Peleg |
| 5,883,824 A | 3/1999 | Lee |
| 5,887,162 A | 3/1999 | Williams |
| 5,887,182 A | 3/1999 | Kinoshita |
| 5,887,183 A | 3/1999 | Agarwal |
| 5,893,145 A | 4/1999 | Thayer |
| 5,896,551 A | 4/1999 | Williams |
| 5,909,572 A | 6/1999 | Thayer |
| 5,953,241 A | 9/1999 | Hansen et al. |
| 5,996,057 A | 11/1999 | Scales, III |
| 6,008,850 A | 12/1999 | Sumihiro |
| 6,009,505 A | 12/1999 | Thayer |
| 6,016,538 A | 1/2000 | Guttag |
| 6,058,465 A | 5/2000 | Nguyen |
| 6,154,826 A | 11/2000 | Wulf |
| 6,173,366 B1 | 1/2001 | Thayer |
| 6,175,901 B1 | 1/2001 | Williams |
| 6,381,690 B1 | 4/2002 | Lee |
| 6,425,073 B2 | 7/2002 | Roussel et al. |
| 6,516,406 B1 | 2/2003 | Peleg |
| 6,584,482 B1 | 6/2003 | Hansen et al. |
| 6,643,765 B1 | 11/2003 | Hansen et al. |
| 6,725,356 B2 | 4/2004 | Hansen et al. |
| 6,807,609 B1 | 10/2004 | Lemmon |

FOREIGN PATENT DOCUMENTS

| | | |
|---|---|---|
| EP | 0427425 A2 | 5/1991 |
| EP | 0468820 A2 | 1/1992 |
| EP | 0 651 321 A | 5/1995 |
| EP | 0 654 733 A | 5/1995 |
| JP | S60-217435 | 10/1985 |
| JP | 3268024 | 11/1991 |
| JP | 06189292 A | 7/1994 |
| JP | 8111090 A2 | 5/1996 |
| JP | 8115069 A2 | 5/1996 |
| WO | WO 91/16680 | 10/1991 |
| WO | WO 93/01565 | 1/1993 |
| WO | WO 93/11500 | 6/1993 |
| WO | WO 97/07450 | 2/1997 |

OTHER PUBLICATIONS

*AT386 CHIPSet Functional Specification*, Chips and Technologies, Inc. (May 8, 1986).

*82C302 Page/Interleave Memory Controller Data Sheet*, Chips and Technologies, Inc. (1987).

J.E. Thornton, Design of a Computer: The Control Data 6600 (1970).

*CS4031 CHIPSet Advance Product Information* (May 10, 1993).

*MPC105 PCI Bridge/Memory Controller Technical Summary*, Motorola, Inc. (Jan. 1995).

Karl Wang et al., "Designing the MPC105 PCI Bridge/Memory Controller," *IEEE Micro 44–49* (Apr. 1995).

Michael J. Garcia & Brian K. Reynolds, "Single Chip PCI Bridge and Memory Controller for PowerPC™ Microprocessors," *IEEE International Conference on Computer Design: VLSI in Computers and Processors 409–12* (Oct. 1994).

Micron MT48LC2M8S1 (S) 2 MEG×8 *SDRAM Advance Data Sheet* (Apr. 1994).

D.J. Lang et al, "Enhanced Refresh Mechanism for Higher Performance in Memory Subsystems," *IBM Technical Disclosure Bulletin* vol. 37, No. 10 (Oct. 1994).

R.E. Busch et al., "Dynamic Random Access Memory Data Burst Control," *IBM Technical Disclosure bulletin* vol. 37, No. 9 (Sep. 1994).

M.J. Carnevale et al., "Fast Data Access of DRAMs by Utilizing a Queued Memory Command Buffer," *IBM Technical Disclosure Bulletin* vol. 35, No. 7 (Dec. 1992).

Configurations for Solid States Memories, *JEDEC Standard No. 21–C, release 4* (Nov. 1993).

Robert Adams and Gregory Scavone, "Design a DRAM controller from the top down," *Electronic Design News*, pp. 183–188 (Apr. 27, 1989).

Dave Bursky, Sychrounous DRAMs Clock at 100MHz, *Electronic Design 45*, 48 (Feb. 18, 1993).

Betty Prince et al., "Synchronous dynamic RAM," *IEEE Spectrum 44–46* (Oct. 1992).

Sean w. McGee et al., "Design of a Processor Bus Interface ASIC for the Stream Memory Controller," *Proceedings of the IEEE International SIC Conference*, Rochester, NY (Sep. 1994).

T. C. Landon et al., "An Approach for Optimizing Synthesized High–Speed ASICs," *Proc. IEEE Int'l ASIC Conference*, Austin, TX (Sep. 1995).

Sally A. McKee, "Hardware Support for Dynamic Access Ordering: Performance of Some Design Options," Computer Science Report No. CS–93–08 (Aug. 9, 1993).

S. A. McKee et al., "Experimental Implementation of Dynamic Access Ordering," *Proceedings of the Twenty–Seventh Hawaii International Conference* (Jan. 1994), Computer Science Report No. CS–93–42 (Aug. 1, 1993).

Sally A. McKee, "Maximizing Memory Bandwidth for Streamed Computations," Ph.D. dissertation (May 1995).

The AMD–K6 3D Processor: Revolutionary Multimedia Performance, Abacus (1998).

"AMD to Co–Sponsor Microsoft Professional Developers Conference," http://www.amd.com/usen/Corporate/VirtualPressRoom/0,,51_104_543_555~953,00.html (Oct. 12, 1997).

Alvarez et al, "A 450MHz PowerPC Microprocessor with Enhanced Instruction Set and Copper Interconnect," ISSCC (Feb. 1999).

"AltiVec™ Technology Programming Environments Manual" (1998).

Tyler et al., "AltiVec™: Bringing Vector Technology to the PowerPC™ Processor Family," IEEE (Feb. 1999).

D. D. Gajski and L. P. Rubinfeld, "Design of Arithmetic Elements for Burroughs Scientific Processor," Proceedings of the 4th Symposium on Computer Arithmetic, Santa Monica, CA, 245–56 (1978).

K. Hwang & F. Briggs, "Computer Architecture and Parallel Processing," McGraw Hill Book Co., Singapore (1988).

BSP and BSP Customer Attributes, Inclosure 5, 1–5, Burroughs Corporation (Aug. 1, 1977).

BSP Floating Point Arithmetic, Burroughs Corporation, 1–27 (Dec. 1978).

BSP, Burroughs Scientific Processor, Burroughs Corporation, 1–29 (Jun. 1977).

D.A. Kuck & R. Stokes, "The Burroughs Scientific Processor (BSP)," IEEE Transactions on Computers, vol. C–31, No. 5, 363–76 (May 1982).

Foley, "The Mpact™ Media Processor Redefines the Multimedia PC," IEEE, Proceedings of COMPON (Spring 1996).

Epstein, "Chromatic Raises the Multimedia Bar," Microprocessor Report (Oct. 23, 1995).

Mpact Media Processor: Preliminary Data Sheet, Chromatic Research, Inc. (Sep. 11, 1996).

Kalapathy, "Hardware–Software Interactions on Mpact," IEEE Micro (1997).

"The Vector Coprocessor Unit (VU) for the CM–5," Hot Chip IV Symposium (Aug. 11, 1992).
"Connection Machine CM–5 Technical Summary," Thinking Machines Corp. (Nov. 1993).
"CMMD User's Guide: Version 3," Thinking Machines Corp. (May 1993).
"CMMD Reference Manual: Version 3," Thinking Machines Corp. (May 1993).
Michielse, "Programming the Convex Exemplar Series SPP System," Proceedings of Parallel Scientific Computing, First Intl Workshop, PARA '94, pp. 375–382 (Jun. 20–23, 1994).
Wadleigh et al., "High Performance FFT Algorithms for the Convex C4/XA Supercomputer," Poster, Conference on Supercomputing, Washington, D.C. (Nov. 1994).
Wadleigh et al., "High–Performance FFT Algorithms for the convex C4/XA Supercomputer," Journal of Super Computing, vol. 9, pp. 163–178 (1995).
Saturn Architecture Specification (Apr. 29, 1993).
Saturn Overview (Nov. 11, 1993 & Feb. 4, 1994).
Saturn Assembly Level Performance Tuning Guide (Jan. 1, 1994).
Saturn Differences from C Series, 1–8, (Feb. 6, 1994).
"GaAs Supercomputer Vendors Hit Hard," Electronic News (Jan. 31, 1994).
Convex Architecture Reference Manual, Sixth Edition (1992).
Convex Assembly Language Reference Manual, First Edition (Dec. 1991).
Convex 3400 Supercomputer System Overview (Jul. 24, 1991).
Convex Data Sheet, "C4/XA High–Performance Programming Environment," Convex Computer Corporation (1994).
Rubinfeld, et al., "Motion Video Instruction Extensions for Alpha" (Oct. 18, 1996).
"Alpha Architecture Reference Manual," Digital Equipment Corporation (1992).
Awaga et al., "The μVP 64–bit Vector Coprocessor: A New Implementation of High–Performance Numerical Computation," IEEE Micro, vol. 13, No. 5, pp. 24–36 (Oct. 1993).
Kimura et al., "Development of Gmicro 32–bit Family of Microprocessors, Fujitsu Semiconductor Special Collection," vol. 43, No. 2, pp. 89–97 (Feb. 1992).
Takahashi et al., "A 289 MFLOPS Single Chip Vector Processing Unit," The Institute of Electronics, Information, and Communication Engineers Technical Research Report , pp. 17–22 (May 28, 1992).
Uchiyama et al., "The Gmicro/500 Superscalar Microprocessor with Branch Buffers," IEEE Micro, pp. 12–21 (Oct. 1993).
Lee, "Accelerating Multimedia with Enhanced Microprocessors," IEEE Micro, vol. 15, No. 2, pp. 22–32 (Apr. 1995).
Undy et al., "A Low–Cost Graphics and Multimedia Workstation Chip Set," IEEE Micro, pp. 10–22 (Apr. 1994).
PA–RISC 1.1 Architecture and Instruction Set Reference Manual, Third Edition, Hewlett–Packard (Feb. 1994).
Asprey et al., "Performance Features of the PA7100 Microprocessor," IEEE Micro, pp. 23–35 (Jun. 1993).
Knebel et al., "HP's PA7100LC: A Low–Cost Superscalar PA–RISC Processor," IEEE, pp. 441–447 (1993).
Gwennap, "New PA–RISC Processor Decodes MPEG Video: HP's PA7100LC Uses New Instructions to Eliminate Decoder Chip," Microprocessor Report (Jan. 24, 1994).

Kurpanek et al., "PA7200: A PA–RISC Processor with Integrated High Performance MP Bus Interface," IEEE COMPCON '94, pp. 375–382 (Feb. 28–Mar. 4, 1994).
Bass, "The PA 7100LC Microprocessor: A Case Study of IC Design Decisions in a Competitive Environment," Hewlett–Packard Journal, vol. 46, No. 2, pp. 12–22 (Apr. 1995).
Bowers et al., "Development of a Low–Cost, High Performance, Multiuser Business Server System," Hewlett–Packard Journal, vol. 46, No. 2, p. 79 (Apr. 1995).
Gwennap, "Digital MIPS Add Multimedia Extensions," Microdesign Resources, pp. 24–28 (Nov. 18, 1996).
Lee et al., "Pathlength Reduction Features in the PA–RISC Architecture," IEEE COMPCON, pp. 129–135 (Feb. 24–28, 1992).
Lee et al., "Real–Time Software MPEG Video Decoder on Multimedia–Enhanced PA 7100LC Processors," Hewlett–Packard Journal, vol. 46, No. 2, pp. 60–68 (Apr. 1995).
Lee, "Realtime MPEG Video via Software Decompression on a PARISC Processor," IEEE, pp. 186–192 (1995).
Martin, "An Integrated Graphics Accelerator for a Low–Cost Multimedia Workstation," Hewlett–Packard Journal, vol. 46, No. 2, pp. 43–50 (Apr. 1995).
"HP 9000 Series 700 Workstations Technical Reference Manual: Model 712 (System)," Hewlett–Packard (Jan. 1994).
PA RISC 2.0 Architecture and Instruction Set Reference Manual, Hewlett–Packard (1995).
Case, "Low–End PA7100LC Adds Dual Integer ALUs," Microprocessor Report (Nov. 19, 1992).
Gwennap, "PA–8000 Combines Complexity and Speed," Microprocessor Report (Nov. 14, 1994).
Crawford, "The i486 CPU: Executing Instructions in One Clock Cycle," IEEE Micro (Feb. 1990).
"i486™ Processor Programmer's Reference Manual," Osborne McGraw–Hill (1990).
"Intel486™ Microprocessor Family Programmer's Manual," Intel Corp. (1995).
"Understanding x86 Microprocessors," MicroDesign Resources, 1993 [pp. 3–16 through 3–20, Wharton, Parallel 486 Pipelines Product Peak Processor Performance Microprocessor Report (Jun. 1989)].
Margulis, "i860 Microprocessor Architecture," Intel Corporation (1990).
Kohn et al., "Introducing the Intel i860 64 bit Microprocessor," IEEE Micro, pp. 15–30 (Aug 1989).
Grimes et al., "A New Processor with 3–D Graphics Capabilities," NCGA '89 Conference Proceedings vol. 1, pp. 275–284 (Apr. 17–20, 1989).
"Paragon User's Guide" (Oct. 1993).
Atkins, "Performance and the i860 Microprocessor," IEEE Micro, pp. 24–27, 72–78 (Oct. 1991).
Grimes et al., "The Intel i860 64–Bit Processor: A General Purpose CPU with 3D Graphics Capabilities," IEEE Computer Graphics & Applications, pp. 85–94 (Jul. 1989).
Kohn et al., "A 1,000,000 Transistor Microprocessor," 1989 IEEE International Solid–State Circuits Conference Digest of Technical Papers, pp. 54–55, 290 (Feb. 15, 1989).
Kohn et al., "A New Microprocessor With Vector Processing Capabilities," Electro/89 Conference Record, pp. 1–6 (Apr. 11–13, 1989).
Kohn et al., "The i860 64–Bit Supercomputing Microprocessor," AMC, pp. 450–456 (1989).

Mittal et al., "MMX Technology Architecture Overview," Intel Technology Journal Q3 '97, pp. 1–12 (1997).

Patel et al., "Architectural Features of the i860—Microprocessor RISC Core and On–Chip Caches," IEEE, pp. 385–390 (1989).

Rhodehamel, "The Bus Interface and Paging Units of the i860 Microprocessor," IEEE, pp. 380–384 (1989).

Perry, "Intel's secret is out," IEEE Spectrum, pp. 22–28 (Apr. 1989).

Sit et al., "An 80 MFLOPS Floating–point Engine in the Intel i860 Processor," IEEE, pp. 374–379 (1989).

Intel Corporation, "i860 XP Microprocessor Data Book" (May 1991).

N12 Performance Analysis dated Sep. 21, 1990.

Deposition of Leslie Kohn on Sep. 9, 2005; *MicroUnity Systems Engineering, Inc. v. Dell, Inc. f/k/a/ Dell Computer and Intel Corporation*; C.A. No. 2–4CV–120; In the United States District Court of the Eastern District of Texas, Marshall Divison.

Padegs et al., "The IBM System/370 Vector Architecture: Design Considerations," IEEE (1988).

Moore et al., "Concepts of the System/370 Vector Architecture," ACM (1987).

Buchholz, "The IBM System/370 Vector Architecture," IBM Systems Journal, vol. 25, No. 1, 1986.

Tucker, "The IBM 3090 System: An Overview," IBM Systems Journal, vol. 25, No. 1, 1986.

Clark et al., "Vector System performance of the IBM 3090," IBM Systems Journal, vol. 25, No. 1, 1986.

Gibson et al., "Engineering and scientific processing on the IBM 3090," IBM Systems Journal, vol. 25, No. 1, 1986.

"Enterprise Systems Architecture/390: Vector Operations," IBM Corp., First Edition (Sep. 1991).

Ide et al., "A 320–MFLOPS CMOS Floating–Point Processing Unit for Superscalar Processors," IEEE Journal of Solid–State Circuits, vol. 28, No. 3, pp. 352–361 (Mar. 1993).

Ide et al., "A 320 MFLOPS CMOS Floating–Point Processing Unit for Superscalar Processors," IEEE 1992 Custom Integrated Circuits Conference, 1992.

"ILLIAC IV Quarterly Progress Report: Oct., Nov., Dec. 1969," ILLIAC IV Document No. 238, Department of Computer Science, University of Illinois at Urbana–Champaign (Jan. 15, 1970).

"ILLIAC IV Systems Characteristics and Programming Manual," Institute for Advanced Computation, Ames Research Center, NASA (Jun. 1, 1972).

Knapp et al., "Bulk Storage Applications in the ILLIAC IV System," ILLIAC IV Document No. 250, Center for Advanced Computation, University of Illinois at Urbana–Champaign (Aug. 3, 1971).

Abel et al., "Extensions to FORTRAN for Array Processing," ILLIAC IV Document No. 235, Department of Computer Science, University of Illinois at Urbana–Champaign (Sep. 1, 1970).

Barnes et al., "The ILLIAC IV Computer," IEEE Transactions on Computers, vol. C–17, No. 8, pp. 746–757 (Aug. 1968).

"Multimedia Extension Unit for the X86 Architecture," Compaq Computer Corp., Revision 0.8b (Jun. 20, 1995).

"Multimedia Extension Unit for the X86 Architecture," Compaq Computer Corp., Revision 0.9 (Jul. 31, 1995).

"Multimedia Extension Unit for the X86 Architecture," Compaq Computer Corp., Revision 0.6b (May 26, 1995).

Gwenap, "Nx686 Goes Toe–to–Toe with Pentium Pro," Microprocessor Report (Oct. 23, 1995).

Silicon Graphics Introduces Enhanced MIPS—Architecture to Lead the Interactive Digital Revolution, Silicon Graphics Press Release (Oct. 21, 1996).

MDMX Digital Media Extension, MIPS.

Gwennap, "Digital, MIPS Add Multimedia Extensions," Microprocessor Report (Nov. 18, 1996).

"MIPS R4000 User's Manual," MIPS Computer Systems, Inc. (1991).

"MIPS R4000 Microprocessor User's Manual: Second Edition," MIPS Technologies, Inc. (1994).

Shanley, Tom, Pentium Pro Processor System Architecture, MindShare, Inc., Addison–Wesley Developers Press (1997).

Intel MMX Technology Overview (Mar. 1996).

"Intel Architecture MMX TM Technology: Programmer's Reference Manual," Intel Corp, (Mar. 1996).

Gwennap, "Intel's MMX Speeds Multimedia," Microprocessor Report (Mar. 5, 1996).

Diefendorff et al., "Organization of the Motorola 88110 Superscalar RISC Microprocessor," IEEE Micro, © IEEE 1992, pp. 40–63.

MC 88110 Second Generation RISC Microprocessor User's Manual published in 1991.

Gipper, "Designing Systems for Flexibility, Functionality, and Performance with the 88110 Symmetric Superscalar Microprocessor," IEEE (1992).

Papadopoulos et al., "*T: Integrated Building Blocks for Parallel Computing," ACM, pp. 624–635 (1993).

Beckerle, "Overview of the START (*T) Multithreaded Computer," IEEE COMPCON, pp. 148–156 (Feb. 22–26, 1993).

Ang, "StarT Next Generation: Integrating Global Caches and Dataflow Architecture," Proceedings of the ISCA 1992 Dataflow Workshop (1992).

Diefendorff et al., "The Motorola 88110 Superscalar RISC Microprocessor," IEEE, pp. 157–162 (1992).

Nikhil et al., "*T: A Multithreaded Massively Parallel Architecture," Computation Structures Group Memo 325–2, Laboratory for Computer Science, Massachusetts Institute of Technology (Mar. 5, 1992).

Patterson, "Motorola Announces First High Performance Single Board Computer Using Superscalar Chip," Motorola Computer Group (1992).

Shipnes, "Graphics Processing with the 88110 RISC Microprocessor," IEEE COMPCON, pp. 169–174 (Feb. 24–28, 1992).

Lowney et al., "The Multiflow Trace Scheduling Compiler," published Oct. 30, 1992.

Colwell et al., "A VLIW Architecture for a Trace Scheduling Compiler," IEEE Transactions on Computers, Aug. 1988.

Colwell et al., "Architecture and Implementation of a VLIW Supercomputer," IEEE, published in 1990.

"BIT Product Summary: B3110/B3120/B2110/B2120 Floating Point Chip Set," Bipolar Integrated Technology, Inc., published Dec. 1986.

"Trace/300 Series: F Board Architecture," Multiflow Computer, Dec. 9, 1988.

N15 External Architecture Specification dated Dec. 14, 1990.

N15 Product Requirements Document dated Dec. 21, 1990.

N15 Product Implementation Plan dated Dec. 21, 1990.

N15 External Architecture Specification (EAS) dated Oct. 22, 1990.

N15 Micro Architecture Specification dated Apr. 30, 1991.

Deposition of Leslie Kohn on Sep. 9, 2005; *MicroUnity Systems Engineering, Inc. v. Dell, Inc. f/k/a/ Dell Computer and Intel Corporation*; C.A. No. 2–4CV–120; In the United States District Court of the Eastern District of Texas, Marshall Division.

Deposition of Larry Mennemeier on Sep. 23, 2005; *MicroUnity Systems Engineering, Inc. v. Dell, Inc. f/k/a/ Dell Computer and Intel Corporation*; C.A. No. 2–4CV–120; In the United States District Court of the Eastern District of Texas, Marshall Division.

Broomell et al., "Classification Categories and Historical Development of Circuit Switching Topologies," Computing Surveys, vol. 15, No. 2, pp. 95–133 (Jun. 1983).

Watkins et al., "A Memory Controller with an Integrated Graphics Processor," IEEE pp. 324–336 (1993).

Iwaki, "Architecture of a High Speed Reed Solomon Decoder," IEEE Consumer Electronics (Jan. 1994).

Le–Ngoc, "A Gate–Array–Based Programmable Reed–Solomon Codec: Structure–Implementation–Applications," IEEE Military Communications (1990).

Eisig, "The Design of a 64–bit Integer Multiplier/Divider Unit" (1993).

Feng, "Data Manipulating Functions in Parallel Processors and Their Implementations," IEEE Transactions on Computers (Mar. 1974).

Tullsen et al., "Simultaneous Multithreading: Maximizing On–Chip Parallelism," Proceedings of the 22nd Annual International Symposium on Computer Architecture (Jun. 1995).

Culler et al., "Analysis Of Multithreaded Microprocessors Under Multiprogramming," Report No. UCB/CSD 92/687 (May 1992).

Laudon et al., "Architectural And Implementation Tradeoffs In The Design Of Multiple–Context Processors," CSL–TR–92–523 (May 1992).

Turcotte, "A Survey of Software Environments for Exploiting Networked Computing Resources," Engineering Research Center for Computational Field Simulation (Jun. 11, 1993).

Kuck, "The Structure of Computers and Computation: vol. 1," John Wiley & Sons, Inc. (1978).

Arnould et al., "The Design of Nectar: A Network Backplane for Heterogeneous Multicomputers," ACM (1989).

Bell, "Ultracomputers: A Teraflop Before its Time," Comm.'s of the ACM (Aug. 1992) pp. 27–47.

Donovan et al., "Pixel Processing in a Memory Controller," IEEE Computer Graphics and Applications, pp. 51–61 (Jan. 1995).

Fields, "Hunting for Wasted Computing Power: New Software for Computing Networks Puts Idle PC's to Work," Univ. of Wisconsin–Madison (1993).

Geist, "Cluster Computing: The Wave of the Future?," Oak Ridge National Laboratory, 84OR21400 (May 30, 1994).

Ghafoor, "Systolic architecture for finite field exponentiation," IEEE Proceedings, vol. 136 (Nov. 1989).

Giloi, "Parallel Programming Models and Their Interdependence with Parallel Architectures," IEEE Proceedings (Sep. 1993).

Hwang et al., "Parallel Processing for Supercomputers & Artificial Intelligence" (1993).

Hwang, "Advanced Computer Architecture: Parallelism, Scalability, Programmability," (1993).

Hwang, "Computer Architecture and Parallel Processing," McGraw Hill (1984).

Jain, "Square–Root, Reciprocal, Sine/Cosine, Arctangent Cell for Signal and Image Processing," IEEE ICASSP'94, pp. II–521–II–524 (Apr. 1994).

Kissell, "The Dead Supercomputer Society—The Passing of a Golden Age?," www.paralogos.com/DeadSuper/ (1998).

Lawrie, "Access and Alignment of Data in an Array Processor," IEEE Transactions on Computers, vol. c–24, No. 12, pp. 99–109 (Dec. 1975).

Litzkow et al., "Condor—A Hunter of Idle Workstations," IEEE (1988).

Markstein, "Computation of Elementary Functions on the IBM RISC System/6000 Processor," IBM J. Res. Develop., vol. 34, No. 1, pp. 111–119 (Jan. 1990).

Nienhaus, "A Fast Square Rooter Combining Algorithmic and Lookup Table Techniques," IEEE Proceedings Southeastcon, pp. 1103–1105 (1989).

Renwick, "Building a Practacial HIPPI LAN," IEEE pp. 355–360 (1992).

Rohrbacher et al., "Image Processing with the Staran Parallel Computer," IEEE Computer, vol. 10, No. 8, pp. 54–59 (Aug. 1977) (reprinted version pp. 119–124).

Ryne, "Advanced Computers and Simulation," IEEE, pp. 3229–3233 (1993).

Siegel, "Interconnection Networks for SIMD Machines," IEEE Computer, vol. 12, No. 6 (Jun. 1979) (reprinted version pp. 110–118).

Singh et al., "A Programmable HIPPI Interface for a Graphics Supercomputer," ACM (1993).

Smith, "Cache Memories," Computing Surveys, vol. 14, No. 3 (Sep. 1982).

Tenbrink et al., "HIPPI: The First Standard for High–Performance Networking," Los Alamos Science (1994).

Toyokura, "A Video DSP with a Macroblock–Level–Pipeline and a SIMD Type Vector–Pipeline Architecture for MPEG2 CODEC," ISSCC94, Section 4, Video and Communications Signal Processors, Paper WP 4.5, pp. 74–75 (1994).

Vetter et al., "Network Supercomputing," IEEE Network (May 1992).

Wang, "Bit–Level Systolic Array for Fast Exponentiation in $GF(2^m)$," IEEE Transactions on Computers, vol. 43, No. 7, pp. 838–841 (Jul. 1994).

Ware et al., "64 Bit Monolithic Floating Point Processors," IEEE Journal Of Solid–State Circuits, vol. Sc–17, No. 5 (Oct. 1982).

"Bit Manipulator," IBM Technical Disclosure Bulletin, pp. 1575–1576 (Nov. 1974).

"Using a Common Barrel Shifter for Operand Normalization, Operand Alignment and Operand Unpack and Pack in Floating Point," IBM Technical Disclosure Bulletin, pp. 699–701 (Jul. 1986).

"Computational Science: Advances Through Collaboration," San Diego Supercomputer Center 1993 Science Report (1993).

High Performance Computing & Communications: Toward a National Information Infrastructure, "National Science Foundation (NSF)" (1994).

National Coordination Office for High Performance Computing and Communications, "High Performance Computing and Communications: Foundation for America's Information Future" (1996).

"The History of the Development of Parallel Computing," http://punch.purdue.edu (1994).

IEEE Standard for Binary Floating–Point Arithmetic, Std IEEE754–1985, © 1985.

IEEE Standard for Scalable Coherent Interface (SCI), Std IEEE1596–1992, © 1993.

Siewiorek, Bell, and Newell, *Computer Structures: Principles and Examples*, McGraw–Hill Book Company, 1982, pp. 306–316.

Slater, Michael, *A Guide to RISC Microprocessors*, Academic Press, Inc., 1992, pp. 33–83, 159–170, 179–204 and 292–314.

Stakem, Patrick, *A Practioner's Guide to RISC Microprocessor Architecture*, John Wiley & Sons, Inc., 1996, pp. 163–171, 173–188, 201–212; 213–226, 231–248 and 273–340.

Multithreaded Computer Architecture: A Summary of the State of the Art, Kluwer Academic Publishers, Chapters 1 and 11 (1994).

Tolmie, "Gigabit LAN Issues: HIPPI, Fibre Channel, or ATM?," Los Alamos National Laboratory Rep. No. LA–UR 94–3994 (1994).

Tolmie, et al., "HIPPI: It's Not Just for Supercomputers Anymore," Data Communications (May 8, 1995).

Slater, "MicroUnity Lifts Veil on MediaProcessor," Microprocessor Report (Oct. 23, 1995).

Harney et al., "The i750 Video Processor: A Total Multimedia Solution," Communications of the ACM, vol. 34, No. 4 (Apr. 1991).

Smith et al., "PowerPC 601 and Alpha 21064: A Tale of Two RISCs," IEEE (1994).

Hennessy et al., "Computer Architecture: A Quantitative Approach," Morgan Kaufmann Publishers, Inc., pp. 94–97 and 162 (1990).

"PowerPC™ 601 RISC Microprocessor User's Manual," Motorola (1993).

"The PowerPC™ Architecture: A Specification for a New Family of RISC Processors," IBM Corp. (May 1994).

1979 Annual Report: The S–1 Project vol. 1 Architecture.

1979 Annual Report: The S–1 Project vol. 2 Hardware.

S–1 Uniprocessor Architecture (UCID 19782) (Apr. 21, 1983).

Farmwald, "On the Design of High–Performance Digital Arithmetic Units," Ph.D Thesis (Aug. 1981).

Farmwald, "Signal Processing Aspects of the S–1 Multiprocessor Project," SPIE vol. 241, Real–Time Signal Processing (1980).

Farmwald, "High Bandwidth Evaluation of Elementary Functions," IEEE Proceedings, 5th Symposium on Computer Arithmetic (1981).

Widdoes, "The S–1 Project: Developing High–Performance Digital Computers," IEEE Computer Society COMPCON Spring 1980 (Dec. 11, 1979).

Broughton et al., "The S–1 Project: Top–End Computer Systems for National Security Applications," (Oct. 24, 1985).

Gilbert, "An Investigation of the partitioning of Algorithms Across an MIMD Computing System," (Feb. 1980).

The S–1 Multiprocessor Test and Evaluation Facility.

L.T. Nguyen et al., "MSP: Multi–Media Signal Processor," Proc. Hot Chips VIII Symp., IEEE CS Press, Los Alamitos, Calif., 1996.

Yao, "Samsung Launches Media Processor," Microprocessor Report (Aug. 26, 1996).

Spaderna et al., "An Integrated Floating Point Vector Processor for DSP and Scientific Computing," IEEE International Conference on Computer Design: VLSI in Computers and Processors, pp. 8–13 (Oct. 1989).

Kohn, et al., "The Visual Instruction Set (VIS) in UltraSPARC™," IEEE, pp. 462–469 (1995).

Gwennap, "UltraSPARC Unleashes SPARC Performance," Microprocessor Report (Oct. 3, 1994).

Gwennap, "UltraSPARC Adds Multimedia Instructions," Microprocessor Report (Dec. 5, 1994).

"The SPARC Architecture Manual: Version 9," SPARC International, Inc. (1994).

"VIS™ Instruction Set User's Manual," Sun Microsystems, Inc. (May 2001).

Borgerson et al., "The Architecture of the Sperry Univac 1100 Series System," IEEE (1979).

Lang et al., "An Optimum Parallel Architecture for High–Speed Real–Time Digital Signal Processing," IEEE (Feb. 1988).

Guttag et al., "A Single–Chip Multiprocessor For Multimedia: The MVP," IEEE Computer Graphics & Applications, pp. 53–64 (Nov. 1992).

Gove, "The MVP: A Highly–Integrated Video Compression Chip," IEEE Data Compression Conference, pp. 215–224 (Mar. 1994).

Gove, "The Multimedia Video Processor (MVP): a Chip Architecture for Advanced DSP Applications," IEEE DSP Workshop, pp. 27–30 (Oct. 2–5, 1994).

TMS320C80 (MVP) Master Processor User's Guide, document No. SPRU109A, © Texas Instruments Incorporated, Mar. 1995.

TMS320C80 (MVP) Parallel Processor User's Guide, document No. PSRU 110A, © Texas Instruments Incorporated, Mar. 1995.

Lee et al., "MediaStation 5000: Integrating Video and Audio," IEEE Multimedia pp. 50–61 (Summer 1994).

Parsons et al., "MediaStation 5000: A Multimedia Workstation for Telemedicine," Image Computing Systems Laboratory, Departments of Electrical Engineering and Radiology, University of Washington (1995).

Karl M. Guttag, "TI's new MVP chip brings parallel–processing power to multimedia applications," Byte.com (Jun. 1994).

TM1000 Preliminary Data Book, TriMedia Product Group (1997).

Leibson, Steven, H., Report from the Eighth Microprocessor Forum (including presentations cited therein), MicroDesign Resources, Sebastopol, Ca. (Nov. 9, 1995).

G.A. Slavenburg, S. Rathnam, and H. Dijkstra, "The Trimedia TM–1 PCI VLIW Media Processor," Proc. Hot Chips VIII Symp., IEEE CS Press, Los Alamitos, Calif. (1996).

Case, "First Trimedia Chip Boards PCI Bus," Microprocessor Report (Nov. 13, 1995).

Case, "Phillips Hopes to Displace DSPs with VLIW," Microprocessor Report (Dec. 5, 1994).

Rathnam et al., "An Architectural Overview of the Programmable Multimedia Processor, TM–1," IEEE, Proceedings of COMPCON (Spring 1996).

Eijndhoven et al., "TriMedia CPU64 Architecture," Int'l Conference on Computer Design (Oct. 1999).

Araki et al., "The Architecture of a Vector Digital Signal Processor for Video Coding," IEEE (1992).

Bhandarkar et al., "VAX Vector Architecture," Digital Equipment Corp., IEEE (1990).

"VAX–11 Architecture Reference Manual," Digital Equipment Corp. (May 1982).

Fenwick et al., "A VLSI Implement of the VAX Vector Architecture," IEEE (1990).

Fossum et al., "Designing a VAX for High Performance," IEEE (1990).

Murray et al., "Micro–Architecture of the VAX 9000," IEEE (1990).

Bhandarkar et al., "Vector Extensions to the VAX Architecture," Digital Equipment Corp., IEEE (1990).

Bhandarkar et al., "VAX Vector Architecture," Digital Equipment Corp. IEEE (1990).

Bhandarkar et al., "High Performance Issue Oriented Architecture," Digital Equipment Corp., IEEE (1990).

Patt, "Microarchitecture Choices (Implementation of the VAX)," ACM (1990).

"VAX 11/780 Data Path Description," Digital Equipment Corp. (Feb. 1979).

Asprey et al., "Performance Features of the PA7100 Microprocessor," IEEE Micro, 22–35 (Jun. 1993).

BSP and BSP Customer Attributes, Inclosure 5, Burroughs Corporation (Aug. 1, 1977).

BSP Floating Point Arithmetic, Burroughs Corporation, (Dec. 1978).

BSP Implementation of Fortran, Burroughs Corporation (Feb. 1978).

BSP, Burroughs Scientific Process, Burroughs Corporation, 1–29 (Jun. 1977).

Bursky, "Synchronous DRAMs Clock at 100 MHz," Electronic Design, vol. 41, No. 4, 45–49 (Feb. 18, 1993).

D. D. Gajski and L. P. Rubinfeld, "Design of Arithmetic Elements for Burroughs Scientific Processor," Proceedings of the 4th Symposium on Computer Arithmetic, Santa Monica, CA, 245–56 (1978).

"System Architecture." ELXSI (2d Ed. Oct. 1983).

"System Foundation Guide," ELXSI (1st Ed. Oct. 1987).

L. Higbie, "Applications of Vector Processing," Computer Design, 139–45 (Apr. 1978).

Ide et al., "A 320–MFLOPS CMOS Floating–Point Processing Unit for Superscalar Processors," IEEE Journal of Solid–State Circuits, vol. 28, No. 3, 352–61 (Mar. 1993).

"IEEE Standard for Communicating Among Processors and Peripherals Using Shared Memory (Direct Memory Access—DMA)," IEEE (1994).

D.A. Kuck & R. Stokes, "The Burroughs Scientific Processor (BSP)," IEEE Transactions on Computers, vol. C–31, No. 5, 363–76 (May 1982).

Lee, "Accelerating Multimedia with Enhanced Microprocessors," IEEE Micro, vol. 15, No. 2, 22–32 (Apr. 1995).

Lion Extension Architecture (Oct. 12, 1991).

"MC88110 Second Generation RISC Microprocessor User's Manual," Motorola (1991).

Spaderna et al., "An Integrated Floating Point Vector Processor for DSP and Scientific Computing," IEEE International Conference on Computer Design: VLSI in Computers and Processors, 8–13 (Oct. 1989).

Sprunt et al., "Priority–Driven, Preemptive I/O Controllers for Real–Time Systems," IEEE (1988).

Thornton, "Design of a Computer—The Control Data 6600," Scott, Foresman and Company (1970).

Watkins et al., "A Memory Controller with an Integrated Graphics Processor," IEEE, 324–36 (1993).

IEEE Draft Standard for "Scalable Coherent Interface–Low–Voltage Differential Signal Specifications and Packet Encoding", IEEE Standards Department, P1596.3/D0.15 (Mar. 1992).

IEEE Draft Standard for "High–Bandwidth Memory Interface Based on SCI Signaling Technology (RamLink)," IEEE Standards Department, Draft 1.25 IEEE P1596.4–199X (May 1995).

Gerry Kane et al., "MIPS RISC Architecture," Prentice Hall (1995).

IBM, "The PowerPC Architecture: A Specification For A New Family of RISC Processors," 2nd Ed., Morgan Kaufmann Publishers, Inc., (1994).

Hewlett–Packard Co., "PA–RISC 1.1 Architecture and Instruction Set," Manual Part No. 09740–90039, (1990).

MIPS Computer Systems, Inc., "MIPS R4000 User's Manual," Mfg. Part No. M8–00040, (1990).

i860™ Microprocessor Architecture, Neal Margulis, Foreword by Les Kohn.

Gove, "The MVP: A Highly–Integrated Video Compression Chip," IEEE Data Compression Conference, pp. 215–224 (Mar. 1994).

Gove, "The Multimedia Video Processor (MVP): A Chip Architecture for Advanced DSP Applications," IEEE DSP Workshop, pp. 27–30 (Oct. 2–5, 1994).

Guttag et al., "A Single–Chip Multiprocessor for Multimedia: The MVP," IEEE Computer Graphics & Applications, pp. 53–64 (Nov. 1992).

Lee et al., "MediaStation 5000: Integrating Video and Audio," IEEE Multimedia pp. 50–61 (Summer 1994).

TMS320C80 (MVP) Parallel Processor User's Guide, Texas Instruments (Mar. 1995).

TMS320C80 (MVP) Master Processor User's Guide, Texas Instruments (Mar. 1995).

Bass et al., "The Pa 7100LC Microprocessor: A Case Study of IC Design Decisions in a Competitive Environment," Hewlett–Packard Journal, vol. 46, No. 2, pp. 12–22 (Apr. 1995).

Bowers et al., "Development of a Low–Cost, High Performance, Multiuser Business Server System," Hewlett–Packard Journal, vol. 46, No. 2, p. 79 (Apr. 1995).

Gwenapp, "New PA–RISC Processor Decodes MPEG Video: Hewlett–Packard's PA–7100LC Uses New Instruction to Eliminate Decoder Chip," Microprocessor Report, pp. 16–17 (Jan. 24, 1994).

Gwennap, "Digital MIPS Add Multimedia Extensions," Microdesign Resources, pp. 24–28 (Nov. 18, 1996).

Kurpanek et al., "PA7200: A PA–RISC Processor with Integrated High Performance MP Bus Interface," IEEE COMPCON '94, pp. 375–382 (Feb. 28–Mar. 4, 1994).

Lee et al., "Pathlength Reduction Features in the PA–RISC Architecture," IEEE Compcon, pp. 129–135 (Feb. 24–28, 1992).

Lee et al., "Real–Time Software MPEG Video Decoder on Multimedia–Enhanced PA 7100LC Processors," Hewlett–Packard Journal, vol. 46, No. 2, pp. 60–68 (Apr. 1995).

Lee, "Realtime MPEG Video via Software Decompression on a PA–RISC Processor," IEEE, pp. 186–192 (1995).

Martin, "An Integrated Graphics Accelerator for a Low–Cost Multimedia Workstation," Hewlett–Packard Journal, vol. 46, No. 2, pp. 43–50 (Apr. 1995).

Undy et al., "A Low–Cost Graphics and Multimedia Workstation Chip Set," IEEE Micro, pp. 10–22 (Apr. 1994).

HP 9000 Series 700 Workstations Technical Reference Manual: Model 712, Hewlett–Packard (Jan. 1994).

PA–RISC 1.1 Architecture and Instruction Set Reference Manual, Third Edition, Hewlett–Packard (Feb. 1994).

Ang "StarT Next Generation: Integrating Global Caches and Dataflow Architecture," Proceedings of the ISCA 1992 Dataflow Workshop (1992).

Beckerle, "Overview of the StarT (*T) Multithreaded Computer," IEEE COMPCON '93, pp. 148–156 (Feb. 22–26, 1993).

Diefendorff et al., "The Motorola 88110 Superscalar RISC Microprocessor," IEEE pp. 157–162 (1992).

Gipper, "Designing Systems for Flexibility, Functionality, and Performance with the 88110 Symmetric Superscalar Microprocessor," IEEE (1992).

Nikhil et al., "*T: A Multithreaded Massively Parallel Architecture," Computation Structures Group Memo 325–2, Laboratory for Computer Science, Massachusetts Institute of Technology (Mar. 5, 1992).

Papadopoulos et al., "*T: Integrated Building Blocks for Parallel Computing," ACM, pp. 624–635 (1993).

Patterson, "Motorola Announced First High Performance Single Board Computer Using Superscalar Chip," Motorola Computer Group (Sep. 1992).

M. Phillip, "Performance Issues for 88110 RISC Microprocessor,"0 IEEE, 1992.

M. Smotherman et al., "Instruction Scheduling for the Motorola 88110," IEEE, 1993.

R. Mueller, "The MC88110 Instruction Sequencer," Northcon, 1992.

J. Arends, "88110: Memory System and Bus Interface," Northcon, 1992.

K. Pepe, "The MC88110's High Performance Load/Store Unit," Northcon, 1992.

J. Maguire, "MC88110: Datpath," Northcon, 1992.

Abel et al., "Extensions to FORTRAN for Array Processing," ILLIAC IV Document No. 235, Department of Computer Science, University of Illinois at Urbana–Champaign (Sep. 1, 1970).

Barnes et al., "The ILLIAC IV Computer," IEEE Transactions on Computers, vol. C–17, No. 8, pp. 746–757 (Aug. 1968).

Knapp et al., "Bulk Storage Applications in the ILLIAC IV System," ILLIAC IV Document No. 250, Center for Advanced Computation, University of Illinois at Urbana–Champaign (Aug. 3, 1971).

Awaga et al., "The μVP 64–bit Vector Coprocessor: A New Implementation of High–Performance Numerical Computation," IEEE Micro, vol. 13, No. 5, pp. 24–36 (Oct. 1993).

Takahashi et al., "A 289 MFLOPS Single Chip Vector Processing Unit," The Institute of Electronics, Information, and Communication Engineers Technical Research Report, pp. 17–22 (May 28, 1992).

Uchiyama et al., "The Gmicro/500 Superscalar Microprocessor with Branch Buffers," IEEE Micro (Oct. 1993).

Broughton et al., "The S–1 Project: Top–End Computer Systems for National Security Applications," (Oct. 24, 1985).

Farmwald et al., "Signal Processing Aspects of the S–1 Multiprocessor Project," SPIE vol. 241, Real–Time Signal Processing (1980).

Farmwald, "High Bandwidth Evaluation of Elementary Functions," IEEE Proceedings, 5th Symposium on Computer Arithmetic (1981).

Gilbert, "An Investigation of the Partitioning of Algorithms Across an MIMD Computing System," (Feb. 1980).

Widdoes, "The S–1 Project: Developing High–Performance Digital Computers," IEEE Computer Society Compcon Spring 1980 (Dec. 11, 1979).

Cornells S–1 Uniprocessor Architecture SMA–4.

The S–1 Project, Jan. 1985, S–1 Technical Staff.

S–1 Architecture and Assembler SMA–4 Manual, Dec. 19, 1979 (Preliminary Version).

Michielse, "Performing the Convex Exemplar Series SPP System," Proceedings of Parallel Scientific Computing First Intl Workshop, PARA '94, pp. 375–382 (Jun. 20–23, 1994).

Wadleigh et al., "High Performance FFT Algorithms for the Convex C4/XA Supercomputer," Poster, Conference on Supercomputing, Washington, D.C. (Nov. 1949).

C4 Technical Overview (Sep. 23, 1993).

Saturn Assembly Level Performance Tuning Guide (Jan. 1, 1994).

Saturn Differences from C Series (Feb. 6, 1994).

"Convex Adds GaAs System," Electronic News (Jun. 20, 1994).

Convex Architecture Reference Manual, Sixth Edition (1992) (51056DOC016599–993).

Convex Assembly Language Reference Manual, First Edition (Dec. 1991).

Convex Data Sheet C4/XA Systems, Convex Computer Corporation.

Saturn Overview (Nov. 12, 1993).

Convex Notebook containing various "Machine Descriptions".

"Convex C4/XA Offer 1 GFLOPS from GaAs Uniprocessor," Computergram International, Jun. 15, 1994.

Excerpt from Convex C4600 Assembly Language Manual, 1995.

Excerpt from "Advanced Computer Architectures—A Design Space Approach," Chapter 14.8, "The Convex C4/XA System".

Convex C4600 Assembly Language Manual, First Edition, May 1995.

Alvarez et al., "A 450MHz PowerPC Microprocessor with Enhanced Instruction Set and Copper Interconnect," ISSCC (Feb. 1999).

Tyler et al., "AltiVec™ Bringing Vector Technology to the PowerPC™: Processor Family," IEEE (Feb. 1999).

AltiVec™ Technology Programming Environments Manual (1998).

Atkins, "Performance and the i860 Microprocessor," IEEE Micro, pp. 24–27, 72–78 (Oct. 1991).

Grimes et al., "A New Processor with 3–D Graphic Capabilities," NCGA '89 Conference Proceedings vol. 1, pp. 275–284 (Apr. 17–20, 1989).

Grimes et al., "The Intel i860 64–Bit Processor: A General–Purpose CPU with 3D Graphics Capabilities," IEEE Computer Graphics & Applications, pp. 85–94 (Jul. 1989).

Kohn et al., "A 1,000,000 Transistor Microprocessor," 1989 IEEE International Solid–State Circuits Conference Digest of Technical Papers, pp. 54–55, 290 (Feb. 15, 1989).

Kohn et al., "A New Microprocessor with Vector Processing Capabilities," Electro/89 Conference Record, pp. 1–6 (Apr. 11–13, 1989).

Kohn et al., "Introducing the Intel i860 64–Bit Microprocessor," IEEE Micro, pp. 15–30 (Aug. 1989).

Kohn et al., "The i860 64–Bit Supercomputing Microprocessor," AMC, pp. 450–456 (1989).

Margulis, "i860 Microprocessor Architecture," Intel Corporation (1990).

Mittal et al., "MMX Technology Architecture Overview," Intel Technology Journal Q3 '97, pp. 1–12 (1997).

Patel et al., "Architectural Features of the i860—Microprocessor RISC Core and On–Chip Caches," IEEE, pp. 385–390 (1989).

Rhodehamel, "The Bus Interface and Paging Units of the i860 Microprocessor," IEEE, pp. 380–384 (1989).

Perry, "Intel's Secret is Out," IEEE Spectrum, pp. 22–28 (Apr. 1989).

Sit et al., "An 80 MFLOPS Floating–Point Engine in the Intel i860 Processor," IEEE, pp. 374–379 (1989).

i860 XP Microprocessor Data Book, Intel Corporation (May 1991).

Paragon User's Guide, Intel Corporation (Oct. 1993).

N15 Micro Architecture Specification, dated Apr. 29, 1991.

N15 External Architecture Specification, dated Oct. 17, 1990.

N15 External Architecture Specification, dated Dec. 14, 1990.

N15 Product Requirements Document, dated Dec. 21, 1990.

N15 Product Implementation Plan, dated Dec. 21, 1990.

N12 Performance Analysis document version 2.0, dated Sep. 21, 1990.

Hansen, "Architecture of a Broadband Mediaprocessor," IEEE COMPCON 96 (Feb. 25–29, 1996).

Moussouris et al., "Architecture of a Broadband MediaProcessor," Microprocessor Forum (1995).

Arnould et al., "The Design of Nectar: A Network Backplane for Heterogeneous Multicomputers," ACM (1989).

Bell, "Ultracomputers: A Teraflop Before Its Time," Communications of the ACM, (Aug. 1992), pp. 27–47.

Broomell et al., "Classification Categories and Historical Development of Circuit Switching Topologies," Computing Surveys, vol. 15, No. 2, pp. 95–133 (Jun. 1983).

Culler et al., "Analysis of Multithreaded Microprocessors Under Multiprogramming," Report No. UCB/CSD 92/687 (May 1992).

Donovan et al., "Pixel Processing in a Memory Controller," IEEE Computer Graphics and Applications, pp. 51–61 (Jan. 1995).

Fields, "Hunting for Wasted Computing Power: New Software for Computing Networks Puts Idle PC's to Work," Univ. of Wisconsin–Madison, http://www.cs.wisc.edu/condor/doc/WiscIdea.html (1993).

Geist, "Cluster Computing: The Wave of the Future?," Oak Ridge National Laboratory, 84OR21400 (May 30, 1994).

Ghafoor, "Systolic Architecture for Finite Field Exponentiation," IEEE Proceedings, vol. 136 (Nov. 1989).

Giloi, "Parallel Programming Models and their Interdependence with Parallel Architecture," IEEE Proceedings (Sep. 1993).

Hwang et al., "Parallel Processing for Supercomputers and Artificial Intelligence," (1993).

Hwang, "Advanced Computer Architecture: Parallelism, Scalability, Programmability," (1993).

Hwang, "Computer Architecture and Parallel Processing," McGraw Hill (1984).

Iwaki, "Architecture of a High Speed Reed–Solomon Decoder," IEEE Consumer Electronics (Jan. 1994).

Jain et al., "Square–Root, Reciprocal, SINE/COSINE, Arctangent Cell for Signal and Image Processing," IEEE ICASSP '94, pp. II–521–II–524 (Apr. 1994).

Laudon et al., "Architectural and Implementation Tradeoffs in the Design of Multiple–Context Processors," Technical Report: CSL–TR–92–523 (May 1992).

Lawrie, "Access and Alignment of Data in an Array Processor," IEEE Transactions on Computers, vol. C–24, No. 12, pp. 99–109 (Dec. 1975).

Le–Ngoc, "A Gate–Array–Based Programmable Reed–Solomon Codec: Structure–Implementation–Applications," IEEE Military Communications (1990).

Litzkow et al., "Condor—A Hunter of Idle Workstations," IEEE (1988).

Markstein, "Computation of Elementary Functions on the IBM RISC System/6000 Processor," IBM J. Res. Develop., vol. 34, No. 1, pp. 111–119 (Jan. 1990).

Nienhaus, "A Fast Square Rooter Combining Algorithmic and Table Lookup Techniques," IEEE Proceedings Southeaston, pp. 1103–1105 (1989).

Renwick, "Building a Practical HIPPI LAN," IEEE, pp. 355–360 (1992).

Rohrbacher et al., "Image Processing with the Staran Parallel Computer," IEEE Computer, vol. 10, No. 8, pp. 54–59 (Aug. 1977) (reprinted version pp. 119–124).

Ryne, "Advanced Computers and Simulation," IEEE, pp. 3229–3233 (1993).

Siegel, "Interconnection Networks for SIMD Machines," IEEE Computer, vol. 12, No. 6 (Jun. 1979) (reprinted version pp. 110 118).

Singh et al., "A Programmable HIPPI Interface for a Graphics Supercomputer," ACM (1993).

Smith, "Cache Memories," Computing Surveys, vol. 14, No. 3 (Sep. 1982).

Tenbrink et al., "HIPPI: The First Standard for High–Performance Networking," Los Alamos Science (1994).

Tolmie, "Gigabit LAN Issues: HIPPI, Fibre Channel, or ATM," Los Alamos National Laboratory Report No. LA–UR 94–3994 (1994).

Tolmie, "HIPPI: It's Not Just for Supercomputers Anymore," Data Communications (May 8, 1995).

Toyokura et al., "A Video DSP with a Macroblock–Level–Pipeline and a SIMD Type Vector–Pipelined Architecture for MPEG2 CODEC," ISSCC94, Section 4, Video and Communications Signal Processors, Paper WP 4.5, pp. 74–75 (1994).

Tullsen et al., "Simultaneous Multithreading: Maximizing On–Chip Parallelism," Proceedings of the 22nd Annual International Symposium on Computer Architecture (Jun. 1995).

Turcotte, "A Survey of Software Environments for Exploiting Networked Computing Resources," Engineering Research Center for Computational Field Simulation (Jun. 11, 1993).

Vetter et al., "Network Supercomputing: Connecting Cray Supercomputers with a HIPPI Network Provides Impressively High Execution Rates," IEEE Network (May 1992).

Wang, "Bit–Level Systolic Array for Fast Exponentiation in GF(2m)," IEEE Transactions on Computers, vol. 43, No. 7, pp. 838–841 (Jul. 1994).

Ware et al., "64 Bit Monolithic Floating Point Processors," IEEE Journal of Solid–State Circuits, vol. Sc–17, No. 5 (Oct. 1982).

"Bit Manipulator," IBM Technical Disclosure Bulletin, pp. 1575–1576 (Nov. 1974).

Finney et al., "Using a Common Barrel Shifter for Operand Normalization, Operand Alignment and Operand Unpack and Pack in Floating Point," IBM Technical Disclosure Bulletin, pp. 699–701 (Jul. 1986).

Data General AViiON AV500, 550 4500 and 5500 Servers.

Jovanovic et al., "Computational Science: Advances Through Collaboration," San Diego Supercomputer Center Science Report (1993).

High Performance Computing and Communications: Toward a National Information Infrastructure, National Science Foundation (NSF) (1994).

National Coordination Office for High Performance Computing and Communications, "High Performance Computing and Communications: Foundation for America's Information Future" (1996).

Wilson, "The History of the Development of Parallel Computing," http://ei.cs.vt.edu/~history/Parallel.html.

IEEE Standard 754 (ANSI/IEEE Std. 754–1985).

Original Complaint for Patent Infringement, *MicroUnity Systems Engineering, Inc. v. Dell, Inc. f/k/a/ Dell Computer and Intel Corporation*; C.A. No. 2–04CV–120; In the United States District Court of the Eastern District of Texas, Marshall Division filed Mar. 26, 2004.

Amended Complaint for Patent Infringement, *MicroUnity Systems Engineering, Inc. v. Dell, Inc. f/k/a/ Dell Computer and Intel Corporation*; C.A. No. 2–04CV–120; In the United States District Court of the Eastern District of Texas, Marshall Division filed Apr. 20, 2004.

Expert Witness Report of Richard A. Killworth, Esq., *MicroUnity Systems Engineering, Inc. v. Dell, Inc. f/k/a/ Dell Computer and Intel Corporation*; C.A. No. 2–04CV–120; In the United States District Court of the Eastern District of Texas, Marshall Division filed Sep. 12, 2005.

Declaration and Expert Witness Report of Ray Mercer Regarding Written Description and Enablement Issues, *MicroUnity Systems Engineering, Inc. v. Dell, Inc. f/k/a/ Dell Computer and Intel Corporation*; C.A. No. 2–04CV–120; In the United States District Court of the Eastern District of Texas, Marshall Division filed Sep. 12, 2005.

Corrected Expert Report of Dr. Stephen B. Wicker Regarding Invalidity of U.S. Patent Nos. 5,742,840; 5,794,060; 5,764,061; 5,809,321; 6,584,482; 6,643,765, 6,725, 356 and Exhibits A–1; *MicroUnity Systems Engineering, Inc. v. Dell, Inc. f/k/a/ Dell Computer and Intel Corporation*; C.A. No. 2–04–CV–120; In the United States District Court of the Eastern District of Texas, Marshall Division filed Oct. 6, 2005.

Defendants Intel and Dell's Invalidity Contentions with Exhibits A–G; *MicroUnity Systems Engineering, Inc. v. Dell, Inc. f/k/a/ Dell Computer and Intel Corporation*; C.A. No. 2–04CV–120; In the United States District Court of the Eastern District of Texas, Marshall Division filed Sep. 19, 2005.

Defendants Dell Inc. and Intel Corporation's Identification of Prior Art Pursuant to 35 USC §282; *MicroUnity Systems Engineering, Inc. v Dell, Inc. f/k/a/ Dell Computer and Intel Corporation*; C.A. No. 2–04CV–120; In the United States District Court of the Eastern District of Texas, Marshall Division filed Oct. 7, 2005.

Request for Inter Partes Reexamination Under 35 USC §§ 311–318 of U.S. Patent No. 6,725,356 filed on Jun. 28, 2005.

Deposition of Larry Mennemeier on Sep. 22, 2005 and Exhibit 501; *MicroUnity Systems Engineering, Inc. v. Dell, Inc. f/k/a/ Dell Computer and Intel Corporation*; C.A. No. 2–04CV–120; In the United States District Court of the Eastern District of Texas, Marshall Division.

Deposition of Leslie Kohn on Sep. 22, 2005; *MicroUnity Systems Engineering, Inc. v. Dell, Inc. f/k/a/ Dell Computer and Intel Corporation*; C.A. No. 2–04CV–120; In the United States District Court of the Eastern District of Texas, Marshall Division.

Intel Article, "*Intel Announces Record Revenue of 9.96 Billion*", Oct. 18, 2005.

The New York Times Article, "*Intel Posts 5% Profit Increase on Demand for Notebook Chips*", Oct. 19, 2005.

USA Today Article, "*Intel's Revenue Grew 18% In Robust Quarter for Tech*", Oct. 19, 2005.

The Wall Street Journal Article, "*Intel Says Chip Demand May Slow*", Oct. 19, 2005.

The New York Times Article, "*Intel Settlement Revives A Fading Chip Designer*", Oct. 20, 2005.

Sony Computer Entertainment America, Inc.'s Answer, Affirmative Defenses, and Counterclaim to Microunity Systems Engineering, Inc.'s Original Complaint, *Microunity Systems Engineering, Inc. v. Sony Corporation of America*, Civil Action No. 2:05 CV 505, Filed Feb. 14, 2006.

IEEE Draft Standard for "Scalable Coherent Interface–Low–Voltage Differential Signal Specifications and Packet Encoding", IEEE Standards Department, P1596.3/D0.15 (Mar. 1992).

IEEE Draft Standard for "High–Bandwidth Memory Interface Based on SCI Signaling Technology (RamLink)," IEEE Standards Department, Draft 1.25 IEEE P1596.4–199X (May 1995).

Gerry Kane et al., "MIPS RISC Architecture," Prentice Hall (1995).

Complaint for Patent Infringement, *Microunity Systems Engineering, Inc. v. Sony Corporation of America*, Civil Action No. 2:05 CV 505, Filed Nov. 5, 2005.

Undy et al., "A Low–Cost Graphics and Multimedia Workstation Chip Set," IEEE Micro, pp. 10–22 (Apr. 1994).

Broughton et al., "The S–1 Project: Top–End Computer Systems for National Security Applications," (Oct. 24, 1985).

Convex Data Sheet C4/XA Systems, Convex Computer Corporation.

Convex C4600 Assembly Language Manual, First Edition, May 1995.

Margulis, "i860 Microprocessor Architecture," Intel Corporation (1990).

Paragon's User's Guide, Intel Corporation (Oct. 1993).

Hwang, "Computer Architecture and Parallel Processing," McGraw Hill (1984).

Deposition of Larry Mennemeier on Sep. 22, 2005 and Exhibit 501: *MicroUnity Systems Engineering, Inc. v. Dell, Inc. f/k/a/ Dell Computer and Intel Corporation*; C.A. No. 2–04CV–120; In the United States District Court of the Eastern District of Texas, Marshall Division.

Deposition of Leslie Kohn on Sep. 22, 2005; *MicroUnity Systems Engineering, Inc. v. Dell, Inc. f/k/a/ Dell Corporation and Intel Corporation*; C.A. No. 2–04CV–120; In the United States District Court of the Eastern District of Texas, Marshall Division.

Markoff, John "Intel Settlement Revives a Fading Chip Designer," The New York Times (Oct. 20, 2005).

Intel Press Release, "Intel Announces Record Revenue of $9.96 Billion," Santa Clara, CA, Oct. 18, 2005.

Wang, Yulun., et al. "The 3DP: A processor Architecture for Three–Dimensional Applications." Computer, IEEE Computer Society, vol. 25, No. 1, 1992, pp. 25–36, XP000287832, ISSN: 0018–9162.

Diefendorff, K., et al. "Organization of the Motorola 88110 Superscalar Risc Microprocessor." IEEE Micro, vol. 12, No. 2, Apr. 1, 1992, XP000266192, ISSN: 0272–1732.

Spaderna et al., *An Integrated Floating Point Vector Processor for DSP and Scientific Computing*, published with the proceedings on the 1989 *IEEE International Conference on Computer Design: VLSI in Computers and Processors*, ("Sharp Integrated Processor Article").

Ide et al., A 320–MFLOPS CMOS Floating–Point Processing Unit for Superscalar Processors, *IEEE Journal of Solid State Circuits*, vol. 28, No. 3, published in Mar. 1993 ("Toshiba Article").

*MC 88110 Second Generation RISC Microprocessor User's Manual* published in 1991 ("Motorola 88110 User Manual").

File Wrapper of United States Patent No. 6,584,482.

Cited References to United States Pat. No. 6,584,482.

Claim Chart for the Hitachi Patent.

Claim Chart for the Sharp Article.

Claim Chart for the Toshiba Article.

Joint Claim Construction and Prehearing Statement that includes MicroUnity's Proposed Claim Construction submitted in *MicroUnity Systems Engineering, Inc. v. Dell, Inc., et al.* No. 2:04–CV–120(TJW) (E.D. Tex 2004).

Selected portions of MicroUnity's Preliminary Infringement Contentions submitted to *MicroUnity Systems Engineering, Inc. v. Dell, Inc., et al.* No. 2:04–CV–120(TJW) (E.D. Tex 2004).

MicroUnity System Engineering, Inc.'s Opening Brief Regarding Claim Construction submitted Apr. 11, 2005 in *MicroUnity Systems Engineering, Inc. v. Dell, Inc., et al.* No. 2:04–CV–120(TJW) (E.D. Tex 2004).

*MicroUnity Systems Engineering, Inc. vs. Dell, Inc. and Intel Corporation*, "Memorandum Opinion and Order," Civil Action No. 2–04–CV–120 (TJW), Document 167, filed Aug. 29, 2005, pp. 1–24.

* cited by examiner

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 10–14 is confirmed.

Claims 2, 5, 7, 9 and 15–23 are cancelled.

Claims 1 and 6 are determined to be patentable as amended.

Claims 3, 4 and 8, dependent on an amended claim, are determined to be patentable.

1. A method for performing a *fixed point* group-multiply-and-sum instruction, said method comprising the steps of:

partitioning each of a plurality of operands into a plurality of *fixed point* symbols, said operands and each of said symbols having a predefined bit width, *each symbol capable of representing a value range using the entire predefined bit width of the symbol*;

multiplying symbols of a first operand with symbols of a second operand, each of such multiplications producing a product; and adding each product so as to produce a single scalar result, said scalar result capable of being represented by a bit width which is equal to or less than said predefined bit width of said operands without a reduction in the accuracy of said result, *wherein the scalar result is greater than can be represented with the predefined bit width of each of the symbols.*

6. A method for performing a *fixed point* group-multiply-sum-and-add instruction, said method comprising the steps of:

partitioning each of a plurality of operands into a plurality of *fixed point* symbols, said operands and each of said symbols having a predefined bit width, *each symbol capable of representing a value range using the entire predefined bit width of the symbol*;

multiplying symbols of a first operand with symbols of a second operand, each of such multiplications producing a product; and adding each product and a third operand so as to produce a single scalar result, said scalar result capable of being represented by a bit width which is equal to or less than said predefined bit width of said operands without a reduction in the accuracy of said result, *wherein the scalar result is greater than can be represented with the predefined bit width of each of the symbols.*

* * * * *